United States Patent
Nakano et al.

(10) Patent No.: US 11,960,939 B2
(45) Date of Patent: Apr. 16, 2024

(54) MANAGEMENT COMPUTER, MANAGEMENT SYSTEM, AND RECORDING MEDIUM

(71) Applicant: Hitachi, Ltd., Tokyo (JP)

(72) Inventors: Kaori Nakano, Tokyo (JP); Shinichi Hayashi, Tokyo (JP); Satoshi Kaneko, Tokyo (JP)

(73) Assignee: HITACHI, LTD., Tokyo (JP)

( * ) Notice: Subject to any disclaimer, the term of this patent is extended or adjusted under 35 U.S.C. 154(b) by 440 days.

(21) Appl. No.: 17/481,833

(22) Filed: Sep. 22, 2021

(65) Prior Publication Data
US 2022/0229697 A1 Jul. 21, 2022

(30) Foreign Application Priority Data
Jan. 19, 2021 (JP) ................................. 2021-006670

(51) Int. Cl.
*G06F 3/00* (2006.01)
*G06F 9/50* (2006.01)

(52) U.S. Cl.
CPC .................. *G06F 9/505* (2013.01)

(58) Field of Classification Search
None
See application file for complete search history.

(56) References Cited

U.S. PATENT DOCUMENTS

| | | | |
|---|---|---|---|
| 2007/0083588 A1* | 4/2007 | Keller | G06Q 10/06 709/202 |
| 2009/0025004 A1* | 1/2009 | Barnard | G06F 9/50 718/104 |
| 2018/0246824 A1* | 8/2018 | Takada | G06F 11/2046 |
| 2019/0312772 A1 | 10/2019 | Zhao et al. | |
| 2020/0228561 A1* | 7/2020 | Petry | H04L 63/1433 |

FOREIGN PATENT DOCUMENTS

JP 2006-221516 A 8/2006

OTHER PUBLICATIONS

M Jeyakarthic, Client Side-Server Side Load Balancing with Grasshopper Optimization Mapreduce Enhancing Accuracy in Cloud Environment. (Year: 2020).*

(Continued)

*Primary Examiner* — Lechi Truong
(74) *Attorney, Agent, or Firm* — Volpe Koenig

(57) ABSTRACT

A management computer manages a data processing infrastructure including a server that executes a job and a storage device that is coupled to the server via a network and stores data used for processing in accordance with the job. The management computer includes a disc and a CPU. The disc stores maximum resource amount information, path information, and load information. The CPU computes a free resource amount of components forming a path to data related to execution of a predetermined job, based on the maximum resource amount information, the path information, and the load information and determines a parallelizable number in a parallel executable processing unit when the predetermined job is executing in the server, based on the free resource amount.

14 Claims, 22 Drawing Sheets

(56) References Cited

OTHER PUBLICATIONS

Extended European Search Report dated Mar. 9, 2022 for European Patent Application No. 21199010.6.
Ramesh et al., "Optimizing the Role of Orchestrator for Integration Aneka PaaS with AWS Cloud," 2020 International Conference on Inventive Computation Technologies (ICICT), pp. 613-616 (2020).
Communication pursuant to Article 94(3) EPC dated Mar. 21, 2022 for European Patent Application No. 21199010.6.

* cited by examiner

FIG. 3

Component information table 310

| Component ID | Monitoring metric type | Maximum performance value |
|---|---|---|
| I/O port 131a | Recieved transfer rate | 10Gbps |
| I/O port 131a | Transmitted transfer rate | 10Gbps |
| I/O port 131b | Recieved transfer rate | 10Gbps |
| I/O port 131b | Transmitted transfer rate | 10Gbps |
| Network 140 | Downstream traffic rate | 10Gbps |
| Network 140 | Upstream traffic rate | 10Gbps |
| Volume 132a | Transfer rate | 2500MB/s |
| Volume 132b | Transfer rate | 2500MB/s |
| Volume 132c | Transfer rate | 2500MB/s |
| Network I/F 121a | Recieved transfer rate | 10Gbps |
| Network I/F 121a | Transmitted transfer rate | 10Gbps |
| Network I/F 121b | Recieved transfer rate | 10Gbps |
| Network I/F 121b | Transmitted transfer rate | 10Gbps |
| Network I/F 121c | Recieved transfer rate | 10Gbps |
| Network I/F 121c | Transmitted transfer rate | 10Gbps |
| ... | ... | ... |

Path information table 320

| Data ID | Network I/F ID | Network ID | I/O port ID | Volume ID |
|---|---|---|---|---|
| DB1_Table1 | Network I/F 121a | Network 140 | I/O port 131a | Volume 132a |
| DB_Table999 | Network I/F 121a | Network 140 | I/O port 131a | Volume 132a |
| DB2_Table1 | Network I/F 121b | Network 140 | I/O port 131a | Volume 132b |
| DB3_Table1 | Network I/F 121c | Network 140 | I/O port 131b | Volume 132c |
| ... | ... | ... | ... | ... |

FIG. 4

Load information table 410
of received transfer rate
of I/O port 131a

| Time | Measured value |
|---|---|
| 2020/01/01; 0:00 | 2.0Gbps |
| 2020/01/01; 0:01 | 2.1Gbps |
| 2020/01/01; 0:02 | 1.9Gbps |
| 2020/01/01; 0:03 | 2.0Gbps |
| ... | ... |

Load information table 420
of transmitted transfer rate
of I/O port 131a

| Time | Measured value |
|---|---|
| 2020/01/01; 0:00 | 0.2Gbps |
| 2020/01/01; 0:01 | 0.1Gbps |
| 2020/01/01; 0:02 | 0.2Gbps |
| 2020/01/01; 0:03 | 0.1Gbps |
| ... | ... |

Load information table 430
of transfer rate of volume
132a

| Time | Measured value |
|---|---|
| 2020/01/01; 0:00 | 250MB/s |
| 2020/01/01; 0:01 | 252MB/s |
| 2020/01/01; 0:02 | 243MB/s |
| 2020/01/01; 0:03 | 250MB/s |
| ... | ... |

FIG. 5

Response time information table 510

| Time | Data ID | Processing type | Response time |
|---|---|---|---|
| 2020/01/01 0:00 | DB1 | Read | 3ms |
| 2020/01/01 0:00 | DB2_Table1 | Read | 5ms |
| 2020/01/01 0:00 | DB3_Table1 | Write | 10ms |
| ... | ... | ... | ... |

Data attribute information table 610

| Data ID | Data capacity |
|---|---|
| DB1_Table1 | 50MB |
| DB1_Table2 | 120MB |
| ... | ... |
| DB1_Table999 | 20MB |
| DB2_Table1 | 100MB |
| ... | ... |

FIG. 7

Process type information table 710

| Process type ID | Calculation time per one processing (msec) | Read unit | Write unit | Number of reads | Number of writes |
|---|---|---|---|---|---|
| Table_to_Table_Extract_Column | 30 | 1 table | 1 table | 1 | 1 |
| Table_to_Csv | 20 | 1 row | 1 file | 1 | 1 |
| Csv_to_Json | 10 | 1 file | 1 file | 1 | 1 |
| ... | | ... | | | |

FIG. 9

Registered job information table 810

| Job ID | Process ID | Process type ID | Parameter | Data source | Output |
|---|---|---|---|---|---|
| Job A | Process a | Table_to_Table_Extract_Column | Date, opening price, closing price | DB1_Table1 ~ DB1_Table999 | DB3_Table1 |
| | | | | | |
| | | | | | |

| Job | Recommended parallel number |
|---|---|
| Job A | 20 |

Output screen 51210
51211 51212

FIG. 14
(a)
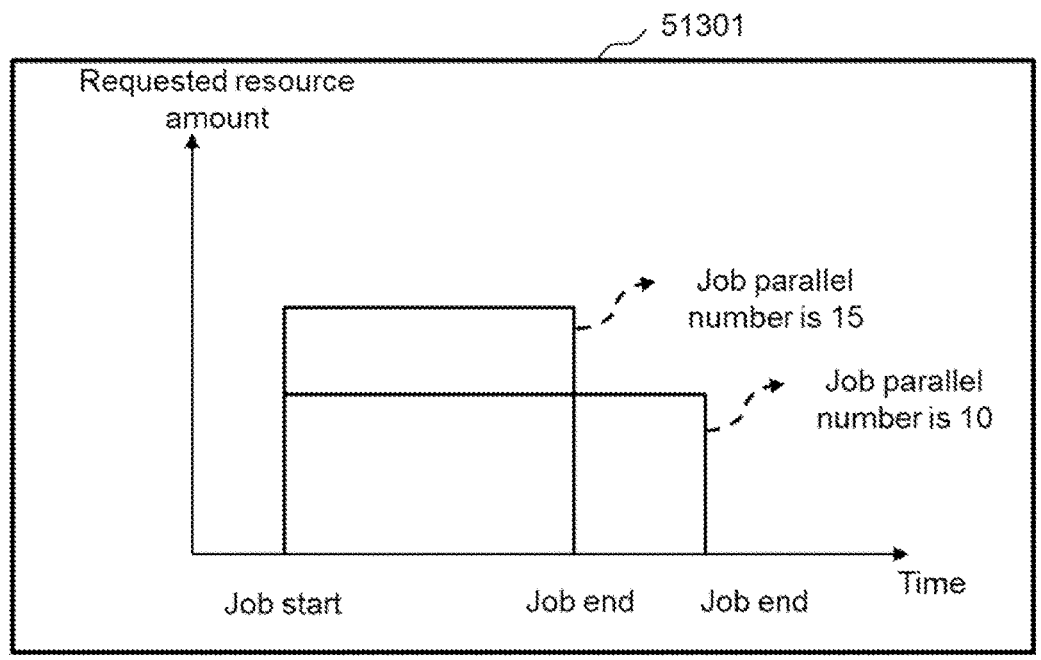
(b)
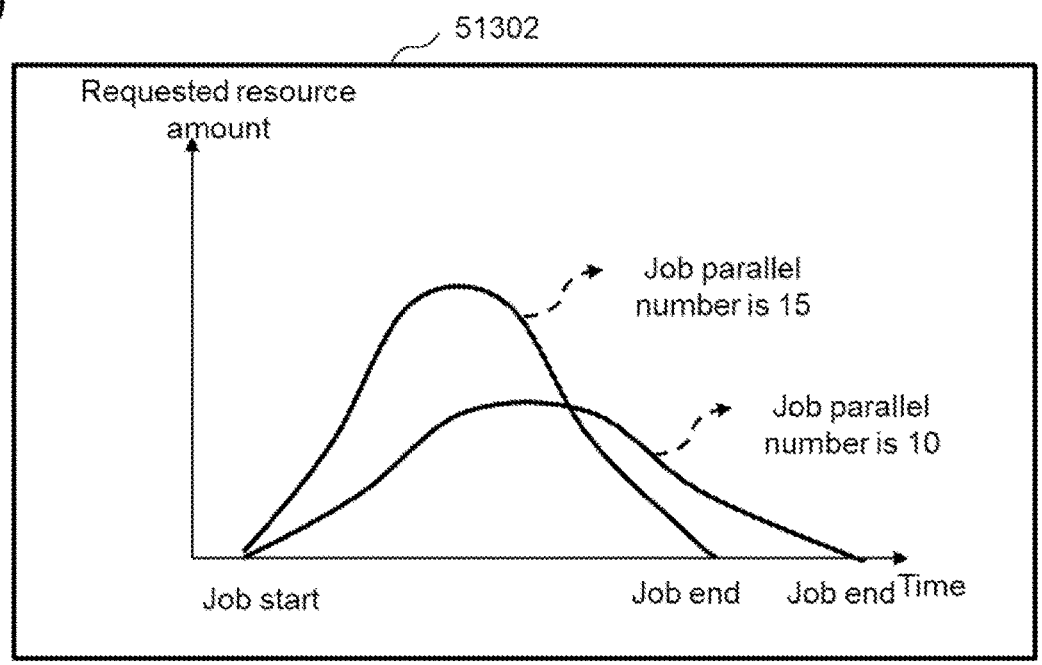

FIG. 15

Registered job information table 850

| Job ID | Process ID | Process type | Parameter | Data source | Output | Start time | Predicted end time | Parallel number |
|---|---|---|---|---|---|---|---|---|
| Job A | Process a | Table_to_Table_Extract_Column | Date, opening price, closing price | DB1_Table1 ~ DB1_Table99 | DB3_Table1 | 2020/01/01 0:00 | 2020/01/01 12:00 | 20 |

FIG. 19

Output screen 51220

| Job 51211 | Recommended parallel number 51212 | Recommended start time 51213 | Predicted end time 51214 |
|---|---|---|---|
| Job A | 20 | 2020/01/02 0:00 | 2020/01/02 1:00 |

FIG. 21

Registered job information table 860

| Job ID | Process ID | Process type ID | Parameter | Data source | Output | Start time | Predicted end time | Parallel number |
|---|---|---|---|---|---|---|---|---|
| Job A | Process a | Table_to_Table_Extract_Column | Date, opening price, closing price | DB1_Table1~ DB1_Table999 | DB3_Table1 | 2020/01/01 0:00 | 2020/01/01 12:00 | 20 |

| Requested resource amount | Allowed end time | Minimum parallel number | Minimum requested resource amount |
|---|---|---|---|
| Network I/F xxx : received transfer rate: 2Gbps<br>Network xxx : upstream transfer rate : 2Gbps<br>I/O port xxx : transmitted transfer rate: 250MB/s<br>Volume xxx: transfer rate: 250MB/s<br>Network I/F xxx : transmitted transfer rate: 2Gbps<br>Network xxx : downstream transfer rate: 2Gbps<br>I/O port xxx : received transfer rate: 250MB/s<br>Volume xxx : received transfer rate: 250MB/s | 2020/01/02 4:00 | 10 | Network I/F xxx : received transfer rate: 1Gbps<br>Network xxx : upstream transfer rate : 1Gbps<br>I/O port xxx : transmitted transfer rate: 125MB/s<br>Volume xxx : transfer rate: 125MB/s<br>Network I/F xxx : transmitted transfer rate: 1Gbps<br>Network xxx : downstream transfer rate: 1Gbps<br>I/O port xxx : received transfer rate: 125MB/s<br>Volume xxx : received transfer rate: 125MB/s |

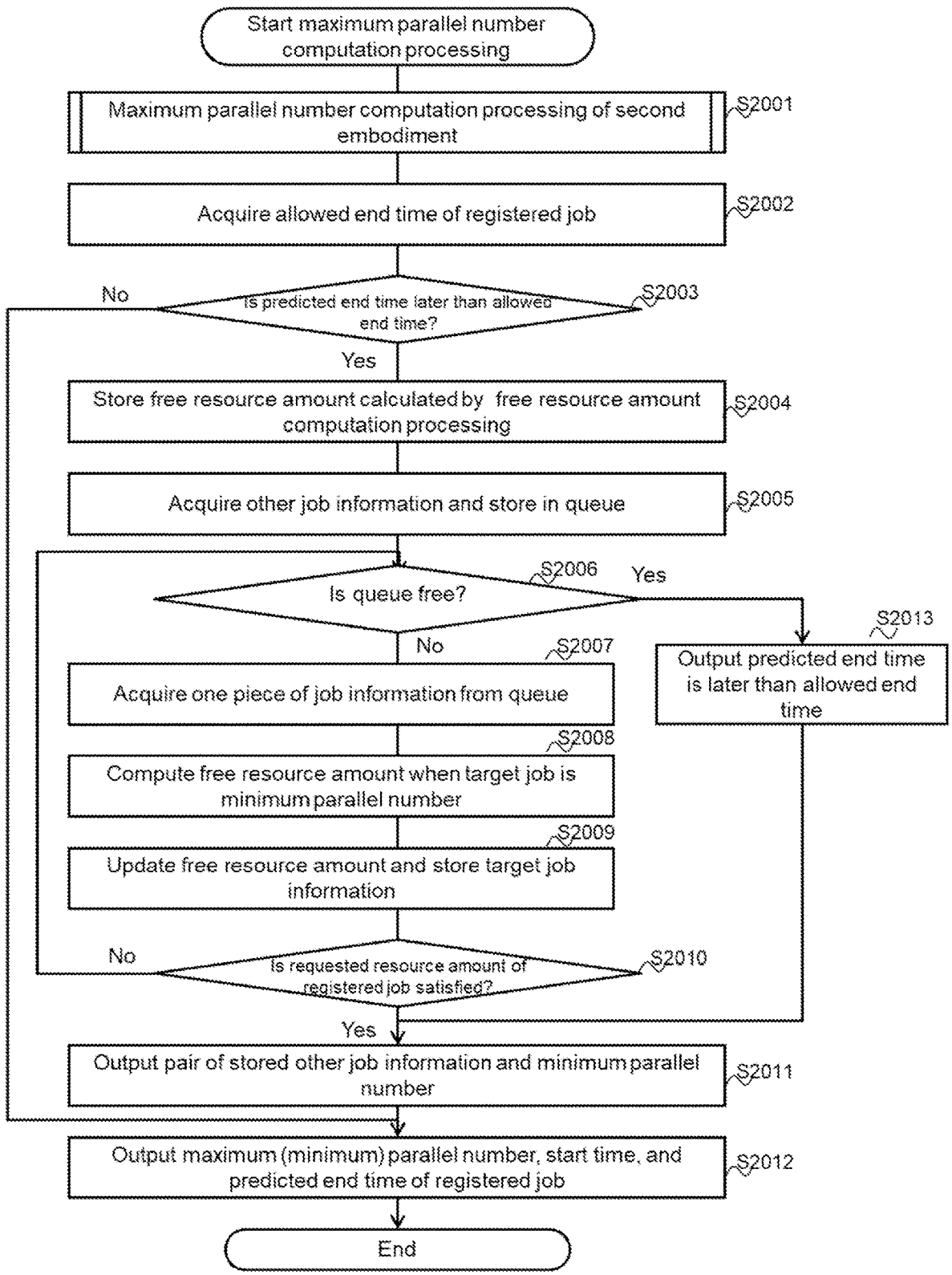

MANAGEMENT COMPUTER, MANAGEMENT SYSTEM, AND RECORDING MEDIUM

CROSS-REFERENCE TO RELATED APPLICATIONS

This application claims priority from Japanese Patent Application No. 2021-6670 filed Jan. 19, 2021. The entire content of the priority application is incorporated herein by reference.

BACKGROUND

The present disclosure relates to a technology for managing a data processing infrastructure including a job execution server that executes a job and a storage device that is coupled to the job execution server via a network and stores data used in processing in accordance with the job.

In recent years, in the field of IT (Information Technology), instead of an IT system being constructed in a data center (on-premise) owned by one company, a public cloud has been used in many cases. A general public cloud is a service in which a data center service provider pools computation resources of servers, discs (also referred to as storages), networks, and the like, and divides and provides the resources for each user by using a virtualization technology or the like. In the public cloud, it is common to perform volume billing based on performance of computation resources used (a computation resource amount such as the number of CPU cores of a server and a quality such as the type of disc) and a usage time. Because of such characteristics, cost can be further decreased by using a public cloud than constructing an on-premise system when a data analysis system that processes a large amount of data in a relatively short time is constructed.

In recent years, cases in which, rather than systems for specific analysis purposes, data analytics platforms (examples of data processing infrastructures) that can collect internal company data or general publicized data to utilize data in whole organizations and that can appropriately extract, transform, and load the data are constructed in public clouds have been increasing.

On the other hand, from a data governance perspective, there are needs for managing data to be processed by an IT system in an own company rather than placing the data in a public cloud. To satisfy such needs, a case of a hybrid cloud configuration is conceivable in which, as a data analytics platform, while a computer processing data is placed in a public cloud, a storage device storing the data is placed in an on-premise system, and the computer and the storage device are coupled via a network.

Before starting data analysis, a data analyst using the data analytics platform selects data to be used from a data catalog of a collected data group (hereinafter referred to as a data lake) in accordance with an analysis purpose, executes processing for extracting, transforming, and loading necessary data (hereinafter referred to as ETL processing), and stores in another storage area the data as a data group for a specific analysis purpose. Because the ETL processing is executed on multiple pieces of similar data, such processing can be executed in parallel in many cases. For example, when the processing can be executed in parallel, the data analyst greatly configures performance or the number of computers (for example, servers) processing data, as well as the parallel number of processes executed in parallel in some cases to complete the data processing as soon as possible.

However, because the data analyst does not ascertain a system configuration of the data analytics platform, the data analyst cannot estimate a data transfer amount which may cause a bottleneck in a server, a network, or a storage device that transfers data to a data processing computer. Therefore, a system that transfers data undergoes a bottleneck of processing performance, and thus a processing time is not shortened although the performance and the number of computers and the number of processed which can be executed in parallel are improved. When a computer that executes processing is placed in a public cloud, a billing amount may increase due to volume billing of the public cloud.

For example, Japanese Patent Application Laid-open No. 2006 221516 discloses a technology for measuring, for each condition, a response time under the condition in which the number of processing requests simultaneously transmitted to a server apparatus (a parallel processing number in the server apparatus) is changed, estimating processing efficiency, and determining a maximum optimum number of steps of processing executed in parallel in the server apparatus, based on an estimation result.

SUMMARY

However, since components of a server, a network, and a storage device constructed to transfer data are shared in a plurality of data processes in a data analytics platform, a maximum transfer rate of data changes in accordance with a usage situation. In the data analytics platform of a hybrid cloud configuration, a computer processing data is located away from the data via a network and the network is shared by a plurality of companies. Therefore, time taken to transmit and receive one piece of data changes and a data transfer rate required for data processing changes. Therefore, even with the same data processing content, the optimum number of processes executed in parallel is not fixed. Hence, the optimum number of processes executed in parallel cannot be determined in the technology of Japanese Patent Application Laid-open No. 2006-221516.

The present disclosure has been devised in view of the foregoing problems and an object of the present invention is to provide a technology for appropriately determining the number of processes executed in parallel appropriate for execution of a job in a job execution server in a data processing infrastructure including a job execution server that executes a job and a storage device that is coupled to the job execution server via a network and stores data used in processing in accordance with the job.

To solve the above-described problems, a management computer according to an aspect is a management computer that manages a data processing infrastructure including a job execution server that is configured to execute a job and a storage device that is coupled to the job execution server via a network and configured to store data used for processing in accordance with the job. The management computer includes a storage device and a processor coupled to the storage device. The storage device is configured to store maximum resource amount information which is information regarding a maximum resource amount of components related to communication between the job execution server and the storage device of the data processing infrastructure, path information which is information regarding a path to data of the storage device of the data processing infrastructure, and load information which is information regarding loads of the components of the data processing infrastructure. The processor is configured to compute a free resource amount of the components forming a path, which is related to execution of a predetermined job, from the job execution server to the data of the storage device, based on the maximum resource amount information, the path information, and the load information, and determine a parallelizable number which is a parallel executable number for parallel executable processing units which are used in the job in the execution of the predetermined job in the job execution server, based on the free resource amount.

BRIEF DESCRIPTION OF THE DRAWINGS

FIG. 3 is a diagram illustrating a configuration of a table of a configuration information storage unit according to the first embodiment;

FIG. 4 is a diagram illustrating a configuration of a load information table of a load information storage unit according to the first embodiment;

FIG. 5 is a diagram illustrating a configuration of a response time information table according to the first embodiment;

FIG. 6 is a diagram illustrating a configuration of a data attribute information table according to the first embodiment;

FIG. 7 is a diagram illustrating a configuration of a process type information table according to the first embodiment;

FIG. 9 is a diagram illustrating a configuration of a registered job information table according to the first embodiment;

FIG. 13 is a diagram illustrating an example of an output screen according to the first embodiment;

FIG. 14 is a diagram illustrating changes in requested resource amounts of jobs;

FIG. 15 is a diagram illustrating a configuration of a registered job information table according to a second embodiment;

FIG. 19 is a diagram illustrating an example of an output screen according to the second embodiment;

FIG. 21 is a diagram illustrating a configuration of a registered job information table according to the third embodiment; and FIG. 22 is a flowchart illustrating a maximum parallel number computation processing according to the third embodiment.

DETAILED DESCRIPTION OF THE EMBODIMENT

Figure 1:
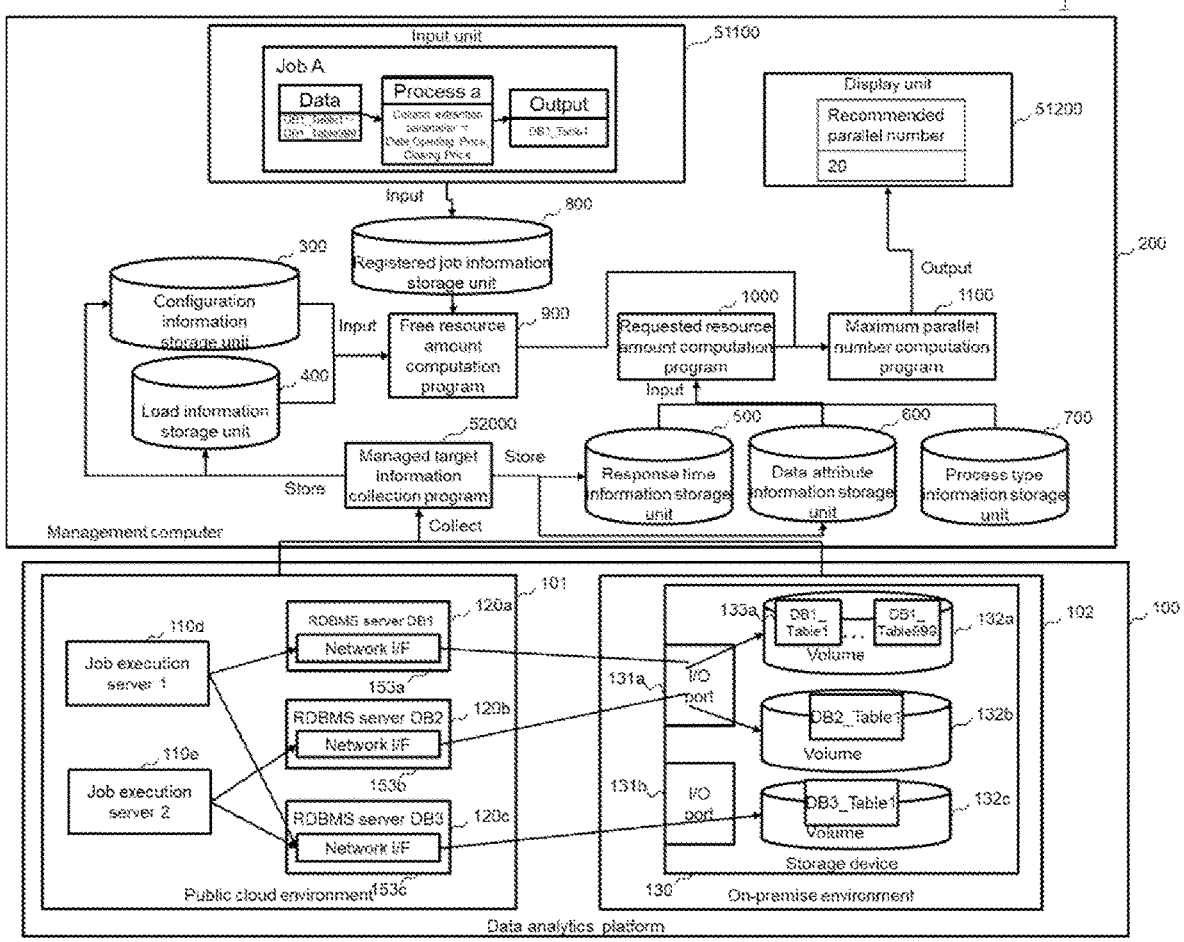
FIG. 1 is a diagram illustrating a whole logical configuration of a data analytics platform management system according to a first embodiment.

In the following description of the present disclosure, the appended drawings which are part of the disclosure will be referred to, but these are exemplary in embodiments for carrying out the present invention and do not limit the present invention. In these drawings, the same reference numerals in the plurality of drawings denote the same components. Further, the detailed description will provide exemplary embodiments. As will be described and illustrated, the present invention is not limited to embodiments described and illustrated in the present specification, and it should be apparent to those skilled in the art that the present invention can be expanded to other embodiments which are known or will be known in future.

In the following description, many specific details will be disclosed so that the present invention can be fully understood. However, it should be apparent to those skilled in the art that not all of the specific details are necessary to carry out the present invention. In different situations, known structures, materials, circuits, processing, and interfaces are not described in detail and/or are illustrated in forms of block diagrams in some cases so that it is not difficult to understand the present invention.

In the following description, a process will be described with a "program" as an operation entity in some cases, but the program may be executed by a processor (for example, a CPU (Central Processing Unit)) to perform a given process appropriately while using a storage device (for example, a memory) and/or an interface device or the like. Therefore, an operation subject of the process may be a processor (or an apparatus or a system including the processor). The processor may include a hardware circuit that performs some or all of the processes. The program may be installed from a program source to an apparatus such as a computer. The program source may be, for example, a program distribution server or a storage medium which can be read by a computer. In the following description, two or more programs may be realized as one program or one program may be realized as two or more programs.

In the following description, when calculators, servers, and computers are described, the servers, and the computers may be physical computers or virtual machines or containers formed by visually dividing physical computers through virtualization technologies or the like.

In the following description, when the same kinds of elements are described separately or the same kinds of elements are not described separately using the reference symbols of the elements, common parent reference symbols are used among the reference symbols of the elements in some cases. For example, when servers are not described separately, servers 150 are used. When individual servers are described separately, the servers are described as servers 150*a* and 150*b* in some cases.

Hereinafter, processing in which one or a plurality of processed are combined among processes of extraction, transformation, and loading is referred to ETL processing in some cases.

Physical or virtual computer, network, storage, OS (Operating System), and middleware included in an IT system are generically referred to as an IT infrastructure in some cases.

In the following description, information will be described with expressions of the form "AAA table", but the information may be expressed with any data structure. That is, to indicate that information does not depend on a data structure, an "AAA table" can be referred to as "AAA information".

First Embodiment

FIG. 1 is a diagram illustrating a whole logical configuration of a data analytics platform management system according to a first embodiment.

A data analytics platform management system 1 is an example of a management system and includes a data analytics platform 100 that processes data designated by a data analyst and a management computer 200 that manages the data analytics platform 100.

The data analytics platform 100 is an example of a data processing infrastructure and includes a storage device 130 that stores data used for data analysis, one or more RDBMS (relational database management system) servers 120 (120a, 120b, and 120c) that transfer data within a designated range, and one or more job execution servers 110 (110d and 110e) that execute predetermined processing (for example, ETL processing) on data. The storage device 130, the RDBMS servers 120, and the job execution servers 110 are coupled to each other via a network 140 (see FIG. 2). The job execution servers 110 and the RDBMS servers 120 may be physical computers or virtual machines or containers formed by virtually dividing a physical computer through a virtualization technology or the like.

In the data analytics platform 100, the job execution servers 110 and the RDBMS servers 120 are disposed in a public cloud environment 101 and the storage device 130 is disposed in an on-premise environment 102. The disposition of the job execution servers 110, the RDBMS servers 120, and the storage device 130 is not limited thereto, but a certain IT infrastructure may be disposed in an on-premise environment or a public cloud environment.

The storage device 130 includes one or more I/O ports 131 (131a and 131b) and one or more volumes 132 (132a, 132b, and 132c) formed by virtually dividing a disc. The I/O port 131 is an interface that transfers data to servers (the job execution server 110 and the RDBMS server 120) via a network. The volume 132 is a storage device that stores data used for a data analysis process in the job execution server 110. For example, the volume 132a stores a table DB1_Table1 (DB1_Table 133a) managed in the RDBMS server DB1 (the RDBMS server 120a).

The RDBMS server 120 includes a network interface device (network I/F) 153. The network I/F 153 is an interface that receives data from the volume 132 or transmits data to the volume 132 based on a request from the job execution server 110.

For example, in the data analytics platform 100, when a data analyst selects data on which the ETL processing is performed from data in the storage device 130 using a computer or the like (not illustrated) and determines processing content, the job execution server 110a acquires designated data from the volume 132a via the RDBMS server 120a, transforms the data, and then stores transformed data in the volume 132c via the RDBMS server 120c. Here, the ETL processing performed on predetermined data is also referred to as a job. Each of Data extraction and transformation included in the ETL processing is also referred to as a process.

The management computer 200 includes a configuration information storage unit 300, a load information storage unit 400, a response time information storage unit 500, a data attribute information storage unit 600, a process type information storage unit 700, and a registered job information storage unit 800.

The configuration information storage unit 300 stores configuration information of an IT infrastructure included in the data analytics platform 100 which is a managed target. The load information storage unit 400 stores time-series data of a load of each component of the IT infrastructure included in the data analytics platform 100. The response time information storage unit 500 stores a time (a response time) taken to read or write data with a predetermined size of the volume 132 from or to the RDBMS server 120 for transferring the data. The data attribute information storage unit 600 stores attribute information of data stored in the storage device 130 used for the data analysis processing.

Information stored in the configuration information storage unit 300, the load information storage unit 400, the response time information storage unit 500, and the data attribute information storage unit 600 is collected from the data analytics platform 100 by a processor of the management computer 200 executing a managed target information collection program 52000 and is updated at any timing.

The process type information storage unit 700 stores a processing computation time necessary to execute a process performed once per predetermined processing unit in a process classified in accordance with content of the processing executed by the job execution server 110 and information regarding a data unit treated in a processing unit. The registered job information storage unit 800 stores information regarding a job registered from an input unit 51100 by the data analyst.

Next, a processing overview of the management computer 200 according to the embodiment will be described.

The management computer 200 starts and executes a free resource amount computation program 900 at the time of detection of registration of a new job, at the time of detection of delay of job execution, at the time of detection of a considerable change in a load of a data transfer path of a job which is being executed, or at any timing. The free resource amount computation program 900 (strictly speaking, a CPU 211 (see FIG. 2) of the management computer 200 executing the free resource amount computation program 900) acquires information regarding a predetermined job (for example, a newly registered job) stored in the registered job information storage unit 800, acquires information regarding a path for transferring data in job execution (path information), maximum performance (a maximum resource amount) of components on the path, and a load of each component on the path from the configuration information storage unit 300 and the load information storage unit 400, and computes a free resource amount of the components on the path.

Subsequently, a requested resource amount computation program 1000 (strictly speaking, the CPU 211 executing the requested resource amount computation program 1000) computes a load applied to components on a path in data transfer at the time of processing of data per processing unit in a process based on a response time on a path related to predetermined job information, data attribute information of data with which a job is processed, and process type information to which the process included in the job belongs. Subsequently, a maximum parallel number computation program 1100 computes a maximum number of processes of the processing unit that can be executed in parallel in the process (a maximum parallel number) from the free resource amount of each component on the path derived by the free resource amount computation program 900 and the load of each component applied per processing unit of each component on the path derived by the requested resource amount computation program 1000 and outputs the maximum parallel number to a display unit 51200. Information displayed by the display unit 51200 may be displayed on a device of an external computer coupled via a network.

For example, when a new job is registered, the management computer 200 derives a maximum parallel number of a process in which the IT infrastructure does not undergo a bottleneck at the time of execution of the new job from a load of the IT infrastructure for data transfer. Thus, at the time of job execution the data analyst can configure performance or the number of job execution servers 110 so that a job is completed earliest and the IT infrastructure does not undergo a bottleneck in the processing of the job execution server 110. Therefore, a billing amount taken to use the job execution server 110 in the public cloud environment 101 can be set to be small. The data analyst may not configure the performance or the number of job execution servers 110 and the management computer 200 may automatically configure the performance or the number without depending on the data analyst.

More specifically, when the job execution server 2 (110e) read and processes data of a DB table DB2_Table1 in sequence via the I/O port 131a and a job execution server 1 (110d) reading tables of DB1_Table1 to DB1_Table999 in sequence is started, a parallel number (a parallel processing number) of processes of the job execution server 1 (110d) can be determined so that the I/O port 131a does not undergo a bottleneck in consideration of a load of the I/O port 131a by the job execution server 2 (110e).

A more specific configuration of the data analytics platform management system 1 will be described.

Figure 2:
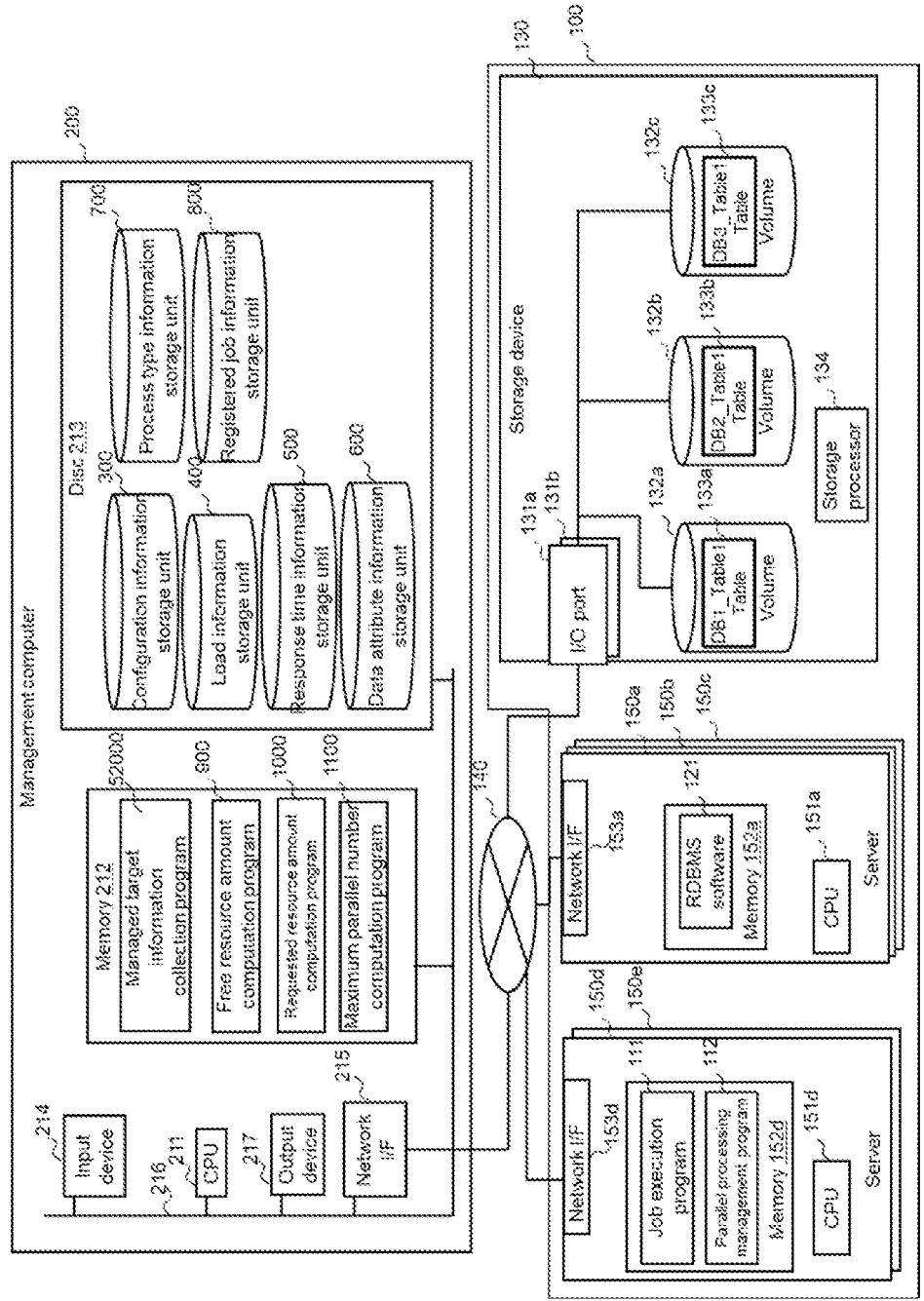
FIG. 2 is a diagram illustrating a whole configuration including a physical configuration of the data analytics platform management system according to the first embodiment.

FIG. 2 is a diagram illustrating a whole configuration including a physical configuration of the data analytics platform management system according to the first embodiment.

The data analytics platform 100 includes one or more servers 150 (150a to 150e) and the storage device 130. The servers 150 and the storage device 130 are communicatively coupled to each other via the network 140. The network 140 may be, for example, a network of a network service in which an on-premise environment and a public cloud environment can communicate via a dedicated line and a network bandwidth is virtually divided and provided for each user, like AWS Direct Connect (registered trademark) of Amazon Inc. In the network service, a maximum bandwidth of an available network may be defined for the user.

The management computer 200 is composed of, for example, a general-purpose computer and includes the CPU 211 which is an example of a processor, a memory 212, a disc 213, an input device 214, a network interface device (network I/F) 215, and an output device 217. These devices are coupled to each other via a system bus 216. The management computer 200 may be configured by a plurality of computers and separation and integration of the computers may be arbitrarily realized in accordance with processing efficiency or the like.

The CPU 211 executes various kinds of processing in accordance with programs stored in the memory 212 and/or the disc 213.

The disc 213 is an example of a storage device and is, for example, a nonvolatile storage device such as an HDD (Hard Disk Drive) or an SSD (Solid State Drive). The disc 213 includes a configuration information storage unit 300, a load information storage unit 400, a response time information storage unit 500, a data attribute information storage unit 600, a process type information storage unit 700, and a registered job information storage unit 800. At least one of these storage units may be possessed by another appropriate storage area to which the CPU 211 can refer.

The memory 212 is an example of a storage device, for example, a RAM (RANDOM ACCESS MEMORY), and stores necessary information or a program executed by the CPU 211. The memory 212 stores the managed target information collection program 52000, the free resource amount computation program 900, the requested resource amount computation program 1000, and the maximum parallel number computation program 1100. At least one of these programs may be stored in another appropriate storage area to which the CPU 211 can refer. Each program may be stored in a computer-readable nonvolatile recording medium and read by a reading apparatus or may be acquired from an external apparatus via the network I/F 215.

The network I/F 215 communicates with another apparatus (the server 150 and the storage device 130) via the network 140. The network I/F 215 acquires, for example, various kinds of information such as configuration information and load information from a managed target apparatus of the management computer 200 such as the server 150 and the storage device 130.

The output device 217 is, for example, a device such as a display or a printer and outputs (typically displays) various kinds of information derived by each program or stored in the disc 213. The input device 214 is, for example, a device such as a keyboard or a pointer device and receives an instruction input from a user.

The server 150 is, for example, a general-purpose computer and includes a memory 152, the network I/F 153, and a CPU 151. The server 150 may further include a disc composed of a nonvolatile storage device such as an HDD. The CPU 151 executes various processes in accordance with programs stored in the memory 152 and/or a disc (not illustrated). The memory 152 is, for example, a RAM and stores necessary information or programs executed by the CPU 151. The network I/F 153 communicates with other apparatuses (the storage device 130, the server 150, the management computer 200, and the like) via the network 140.

The servers 150 include the servers (150d and 150e) configuring the job execution servers 110 (110d and 110e) and the servers (150a, 150b, and 150c) configuring the RDBMS servers 120.

The memory 152 of the server (150d or 150e) configuring the job execution server 110 (110d or 110e) stores a job execution program 111 that executes a job registered by the data analyst and a parallel processing management program 112 that controls parallel execution of processing of the job. The server (150d or 150e) configuring the job execution server 110 (110d or 110e) has a function of transmitting configuration information, load information, response time information, and the like of the server 150 via the network 140, for example, when a request is made from the management computer 200.

The memory 152 of the server (150a, 150b, or 150c) configuring the RDBMS server 120 stores RDBMS software 121 for acquiring and transferring designated data. The server (150a, 150b, or 150c) configuring the RDBMS server 120 has a function of transmitting the configuration information, the load information, the response time information, and the like of the server 150 via the network 140 or a function of transmitting data attribute information of managed data, for example, when a request is made from the management computer 200.

The storage device 130 is a device that provides a storage area (a logical volume) for a program running on the server 150. The storage device 130 includes one or more I/O ports 131, one or more volumes 132 (in the drawing, 132a, 132b, and 132c) and a storage processor 134 such as a CPU.

The I/O port 131 is an interface that communicates with an apparatus (for example, the server 150, the management computer 200, or the like) coupled via the network 140.

The volume 132 is a storage device that stores data used for data analysis. The volume 132 is a storage device formed by virtually dividing the disc. The disc configuring the volume 132 may be one or more nonvolatile storage devices such as an HDD or an SSD. The volume 132 may be a RAID (Redundant Array of Independent (or Inexpensive) Disks) group configured by a plurality of HDDs. For example, the volume 132a stores the table DB1_Table1 managed in the RDBMS server DB1. The data on the volume 132 is transferred via one or more I/O ports 131 allocated to the volume 132.

The storage device 130 may provide a volume as a storage area to the server 150. In this case, the storage device 130 may transmit the configuration information, the load information, and the like of the storage device 130 to the management computer 200.

<Configuration Information Storage Unit 300>

FIG. 3 is a diagram illustrating a configuration of a table of a configuration information storage unit according to the first embodiment.

The configuration information storage unit 300 stores a component information table 310 and a path information table 320.

The component information table 310 is a table that stores a maximum resource amount (performance value) of the components of the IT infrastructure included in the data analytics platform 100 and stores an entry for each component.

The entry of the component information table 310 includes fields of a component ID 311, a monitoring metric type 312, and a maximum performance value 313. In the component ID 311, a value (a component ID) for uniquely identifying a component of the IT infrastructure configuring the managed target data analytics platform 100 is stored. In the monitoring metric type 312, a value (a metric type or a monitoring metric type) for identifying a monitored item of performance of the component is stored. In the maximum performance value 313, a maximum value (a maximum performance value: maximum resource amount) of the performance of the item of the metric type corresponding to the entry is stored with regard to the component of the component ID corresponding to the entry. The maximum performance value 313 may include unit information indicating magnitude of the maximum performance value. The maximum performance value stored in the maximum performance value 313 may be a physical limit value of the component a value that takes a margin of the physical limit value so that a performance obstacle does not occur.

For example, an entry 3101 indicates the following content. That is, this indicates that a maximum performance value of a transfer rate (a received transfer rate) at the time of reception of data of the component (here, the I/O port 131a) of the component ID "I/O port 131a" is 10 Gbps.

The path information table 320 is a table that stores a list (path information) of components on a path along which data is input and output for transferring predetermined data to the job execution server 110 or transferring the predetermined data from the job execution server 110 and stores an entry for each data group storing the data. An entry of the path information table 320 includes fields of a data ID 321, a network I/F ID 322, a network ID 323, an I/O port ID 324, and a volume ID 325.

In the data ID 321, a value (a data ID) for uniquely identifying a data group classified and divided so that the data analyst can use it in the managed target data analytics platform 100 and a data storage destination is stored. For example, one database table for analyzing a stoke price which stores a date and an opening price and a closing price on the date for each row (one entry) may be one data group.

In the network I/F ID 322, a value (a network I/F ID) for uniquely identifying a network I/F of a server (for example, the RDBMS server 120) that transfers data of the data group indicated by the data ID corresponding to the entry to the job execution server 110 is stored. In the network ID 323, a value (a network ID) for uniquely identifying a network that transfers the data of the data group indicated by the data ID corresponding to the entry to the job execution server 110 is stored. In the I/O port ID 324, a value (an I/O port ID) for uniquely identifying the I/O port 131 of the storage device 130 that transfers the data of the data group indicated by the data ID 321 corresponding to the entry to the job execution server 110 is stored. In the volume ID 325, a value (a volume ID) for uniquely identifying the volume 132 in which the data of the data group indicated by the data ID 321 corresponding to the entry is stored is stored.

For example, an entry 3201 of the path information table 320 indicates that a path along which the data of the data group with the data ID "DB1_Table1" is transferred to the job execution server 110 is a path along which the data is transferred from "volume 132a" via "network I/F 121a", the network of "network 140", and "I/O port 131a". A plurality of paths may be formed for the data group of one data ID. For example, the number of paths is plural when a plurality of I/O ports 131 are allocated to one volume 132 and data is loaded via any I/O port 131. The path information table 320 stores not only a path along which data used for the ETL processing is read like the entry 3201 but also a path along which data after the ETL processing is stored like the entry 3204. In the embodiment, the path information includes the data, the network I/F, the network, the I/O port, and the volume, but other components which may undergo a bottleneck may be included. For example, a storage processor, a CPU of the RDBMS server, or the like in which a load occurs at the time of transferring of data may be included.

In the embodiment, the component ID stored in the component information table 310 or the path information table 320 may be a value for identifying physical components or a value for identifying components in which physical components are virtually integrated or divided. For example, when the plurality of I/O ports are virtually integrated, one identifier of an integrated virtual I/O port may be used. Conversely, when one I/O port is divided into a plurality of virtual I/O ports and an upper limit of each resource is set, the component ID may be each identifier of each virtual I/O port. When the RDBMS server 120 or the volume 132 is virtualized by RDBMS software or the like, similarly the component ID may be an identifier of one component indicating a plurality of physical components.

<Load Information Storage Unit 400>

The load information storage unit 400 stores a load information table that stores a time-series transition of a load monitored for each monitoring metric type in each component of the data analytics platform 100 collected by the managed target information collection program 52000.

FIG. 4 is a diagram illustrating a configuration of a load information table of a load information storage unit according to the first embodiment.

The load information storage unit 400 stores load information tables (410, 420, 430, and the like) for each combination of the components and the monitoring metric types. In the embodiment, the load information storage unit 400 stores, for example, the same number of load information tables as the number of entries (the number of combinations of the components and the monitoring metric types) of the component information table 310. The load information table 410 is an example of a load information table corresponding to a received transfer rate of the I/O port 131a, the load information table 420 is an example of a load information table corresponding to a transmitted transfer rate of the I/O port 131a, and the load information table 430 is an example of a load information table corresponding to a transfer rate of the volume 132a.

Entries of the load information tables (410, 420, and 430) include fields of times 401 (401a, 401c, and 401e) and measured values 402 (402b, 402d, and 402f). In the time 401, a time at which a load in the monitoring metric type of a component is measured is stored. In the measured value 402, a value of the measured load is stored. For example, an entry 4101 of the load information table 410 indicates the following content. That is, it indicates that a load of a received transfer rate of the I/O port 131a was 2.0 Gbps at 00:00 on Jan. 1, 2020.

<Response Time Information Storage Unit 500>

The response time information storage unit 500 stores a response time information table 510 that stores information regarding a time (referred to as a response time in some cases) taken to read or write from or to the volume 132 predetermined data with a predetermined size from the RDBMS server 120 for transferring the data. For example, the RDBMS server 120 may execute a response time measurement program that reads and writes predetermined data and measures response times of the reading and writing, and the managed target information collection program 52000 may store information regarding the response times measured by the response time measurement program in the response time information table 510. The response time measurement program may be executed by the job execution server 110 or another computer in the same environment as the job execution server 110. This measurement of the response time executed by the response time measurement program may be performed periodically or immediately before requested resource amount computation processing (see FIG. 11) to be described below.

FIG. 5 is a diagram illustrating a configuration of a response time information table according to the first embodiment.

A response time information table 510 includes fields of a time 511, a data ID 512, a processing type 513, and a response time 514. In the time 511, a time at which a response time is measured is stored. In the data ID 512, a value (a storage destination ID) for uniquely identifying a storage destination of data read or written to measure a response time is stored. For example, when a data group of the read data corresponds to a data storage destination, the storage destination ID may be a data ID of the data group.

In the processing type 513, a type of processing (a processing type) executed to measure a response time, for example, a value for identifying read processing or write processing of data, is stored. In the response time 514, the measured response time is stored. The response time may be a response time in the measurement executed once or an average value or a maximum value of times obtained by executing the measurement a plurality of times.

For example, an entry 5003 indicates the following content. This indicates that, with regard to data of a data group with a data ID "DB3_Table1" at 00:00 on Jan. 1, 2020, a time taken to write data with a predetermined size at a storage destination is 10 ms (milliseconds). In the embodiment, the measurement of the response time is executed for each piece of data of the data group of the data ID and each data storage destination, but it may be executed for each volume or each RDBMS server. For data with the same path, measurement of a response time may be executed collectively once.

<Data Attribute Information Storage Unit 600>

The data attribute information storage unit 600 stores a data attribute information table 610 that stores information (data attribute information) regarding an attribute (for example, capacity of data) of a data group classified and divided so that the data analyst can use it in the managed target data analytics platform 100.

FIG. 6 is a diagram illustrating a configuration of a data attribute information table according to the first embodiment.

The data attribute information table 610 stores an entry for each data group. The entry of the data attribute information table 610 includes fields of a data ID 611 and a data capacity 612. In the data ID 611, a value (a data ID) for uniquely identifying a data group classified and divided so that the data analyst can use it is stored. In the data capacity 612, a capacity of a data group (a data capacity) of the data ID corresponding to the entry is stored.

For example, an entry 6001 indicates the following content. That is, this indicates that a data capacity of a data of a data group with a data ID "DB1_Table1" is 50 MB.

In the embodiment, hereinafter, to give an example in which the ETL processing using one RDB table as one unit of a parallelizable processing unit is executed, a data capacity is stored using one RDB table as a unit in the data attribute information table 610. When the unit of data in which the ETL processing is executed is likely to be a row unit of the RDB table, a data capacity of the row unit may be stored or an average value of the data of the row unit may be stored together in the data attribute information table 610. In the embodiment, since the data of RDB is a target, the data capacity of the RDB table is stored. However, for example, when target data on which the ETL processing is executed is a file, a data capacity of each file may be stored. When data is stored in an object storage, a data capacity of an object may be stored. To make parallel processing of the ETL processing efficient, each data capacity of each partition or an average value of logical partitions may be stored together when the RDB table, the file, and the object are divided and managed into the logical partitions by ETL processing software.

<Process Type Information Storage Unit 700>

The process type information storage unit 700 stores a process type information table 710 in which content of the process of the job executed by the job execution server 110 in the managed target data analytics platform 100 is classified, and a computation processing time taken for one-time execution of the parallelizable processing unit in the process and information regarding the data of the processing unit in the process are stored.

FIG. 7 is a diagram illustrating a configuration of a process type information table according to the first embodiment.

The process type information table 710 stores an entry of each type of process. The entry of the process type information table 710 stores fields of a process type ID 711, a calculation time per one processing 712, a read unit 713, a write unit 714, the number of reads 715, and the number of writes 716.

In the process type ID 711, a value (a process type ID) which is classifying the content of the process configuring the job which can be executed by the job execution server 110 and which is uniquely identified is stored. In the calculation time per one processing 712, a computation time (a processing computation time) taken for one-time execution of a parallelizable processing unit at the time of execution of the process is stored. In the embodiment, it is assumed that the processing computation time does not include a time taken to transfer data necessary for processing. As the calculation time per one processing, a value derived by executing the process experimentally in advance and measuring a processing computation time in construction or the like of the data analytics platform 100 may be used or a value obtained by measuring a similar process in another data analytics platform may be used. The processing computation time may be measured at the time of execution of a process of a job corresponding to the entry and may be updated at each time.

In the read unit 713, a unit of data read from the volume 132 per parallelized processing unit is stored. In the write unit 714, a unit of data written on the volume 132 per parallelized processing unit is stored. In the number of reads 715, the number of times data is read from the volume 132 per parallelized processing unit is stored. In the number of writes 716, the number of times data is written on the volume 132 per parallelized processing unit is stored.

For example, an entry 7001 indicates the following content. That is, this indicates that, for a process with a process type ID "Table_to_Table_Extract_Column", a processing computation time taken per parallelized processing unit is 30 milliseconds, and one table is read from the volume 132 and one table is written on the volume 132 per parallelized processing unit.

In the embodiment, a processing computation time per processing unit of a predetermined process is used as a unique value, but is not determined uniquely depending on processing content. For example, the processing computation time is considerably changed in accordance with a data capacity treated in the processing per processing unit or the performance of the job execution server 110 in some cases. In this case, a model (for example, a computation expression indicating a correlation between a data capacity and a processing computation time per processing unit) of a data capacity of each process type and a processing computation time per processing unit or a model of the job execution server and the processing computation time per processing unit may be prepared. Based on information regarding the data attribute information table 610, a processing computation time per processing unit may be computed at a timing at which a requested resource amount computation process (see FIG. 11) to be described below is executed or a timing at which a job is registered. In the embodiment, information regarding the data processed in the processing unit is stored in the table, but the present invention is not limited thereto.

For example, when processing such as free resource amount computation processing (see FIG. 10) to be described below is executed, a source code of a processing program to be executed may be analyzed and similar information may be extracted and used.

<Input Screen>

Figure 8:
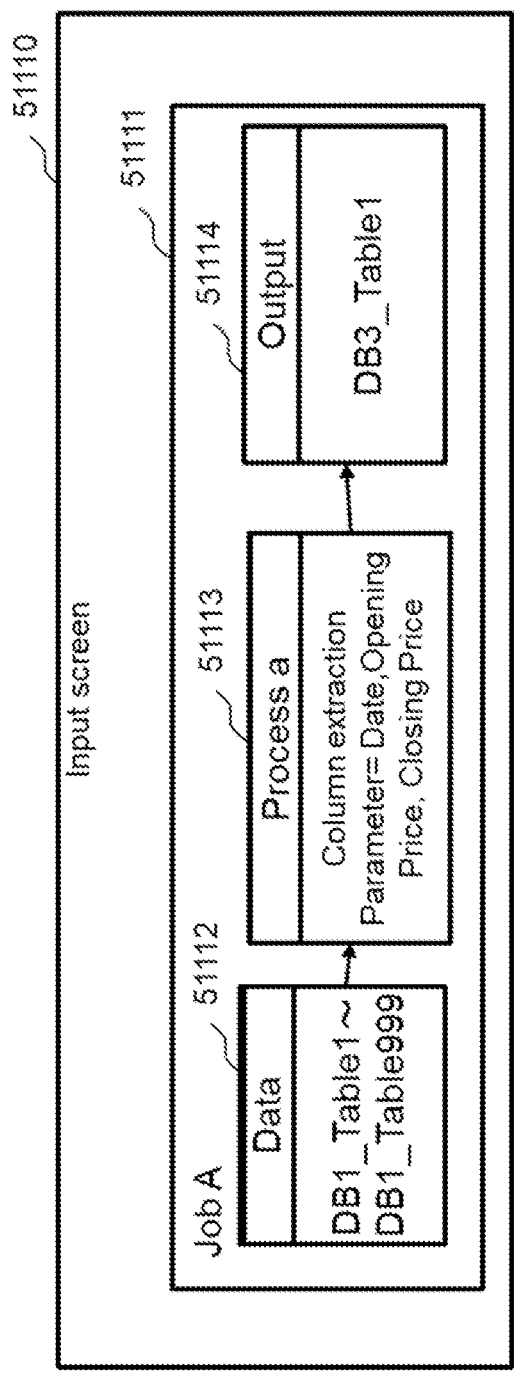
FIG. 8 is a diagram illustrating an example of an input screen according to the first embodiment.

FIG. 8 is a diagram illustrating an example of an input screen according to the first embodiment. The input screen illustrated in FIG. 8 indicates an example of a case in which the input screen is implemented by a GUI (Graphical User Interface).

An input screen 51110 is an input screen for the data analyst to input input data on which the ETL processing is executed, ETL processing content to be executed, a storage destination of the processed data, and a relation therebetween using the input unit 51100. The input screen 51110 includes an input area 51111. The input area 51111 includes a data node 51112, a process node 51113, and an output node 51114. The data node 51112 is an area in which a data source for executing the ETL processing on the job is defined. The process node 51113 is an area in which processing executed in the process is defined. The output node 51114 is an area in which a storage destination of the processed data is defined.

The input screen 51110 indicates that a job A sets 999 tables with IDs DB1_Table1 to DB1_Table999 which are managed by the RDBMS server 120a as input and extracts "Date", "Opening Price", and "Closing Price" among columns of tables and stores "Date", "Opening Price", and "Closing Price" in the table of DB3_Table1 managed by the RDBMS server 120c (DB3).

<Registered Job Information Storage Unit 800>

The registered job information storage unit 800 stores a registered job information table 810 that stores information regarding a process executed by the job which is scheduled to be executed or is being executed, a data source, and an output based on information input by the input unit 51100.

FIG. 9 is a diagram illustrating a registered job information table according to the first embodiment.

The registered job information table 810 stores an entry of each job. The entry of the registered job information table 810 stores fields of a job ID 811, a process ID 812, a process type ID 813, a parameter 814, a data source 815, and an output 816.

In the job ID 811, a value (a job ID) for uniquely identifying a job registered by the data analyst (a registered job) is stored. In the process ID 812, a value (a process ID) for uniquely identifying a process (processing) executed by the job is stored. In the process type ID 813, a value (a process type ID) for uniquely identifying a type of process is stored. In the parameter 814, a configuration value (a parameter) in the process is stored. In the parameter 814, for example, a configuration value configured in the process node 51113 of the input screen 51110 is stored. In the data source 815, a value for identifying data input to the process is stored. In the data source 815, for example, a value configured in the data node 51112 of the input screen 51110 is stored. In the output 816, a value for uniquely identifying a storage destination of data output in the process is stored. In the output 816, for example, a value configured in the output node 51114 of the input screen 51110 is stored.

For example, an entry 8001 indicates the following content. That is, this indicates that "process a" of the process type "Table_to_Table_Extract_Column" is configured with a configured value "Date, Opening Price, Closing Price" is configured and is executed in the job with the job ID "job A", input data to the process a is 999 tables of "DB1_Table1 to DB1_Table999", and a storage destination of the processed data is the table of "DB3_Table1".

In the embodiment, one piece of input data, one process, and one output are defined for one job, but a plurality of definitions may be made for one job. For example, a process b in which a processing result is input may be defined after executing the process a in the job, and when a result of the process b is stored in the volume 132 inside the storage device 130, a plurality of processes and input data and an output of each process may be stored in the entry.

Next, a processing operation in the data analytics platform management system 1 will be described in detail.

<Free Resource Amount Computation Processing>

The free resource amount computation processing is processing performed by allowing the CPU 211 to execute the free resource amount computation program 900 of the management computer 200 and is processing for computing a free resource amount of each component forming a data transfer path of the data processed by the job.

Figure 10:
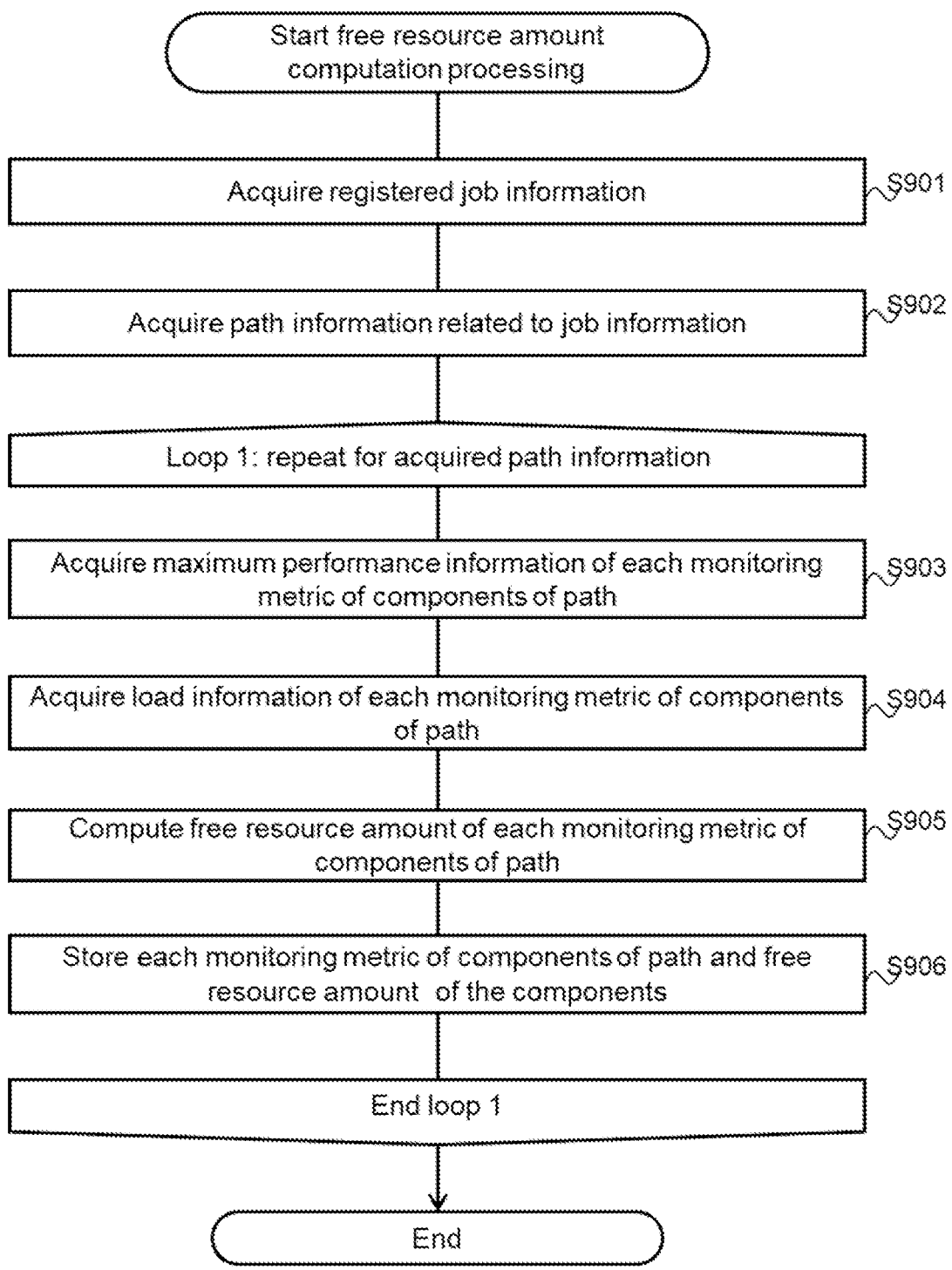
FIG. 10 is a flowchart illustrating a free resource amount computation processing according to the first embodiment.

FIG. 10 is a flowchart illustrating free resource amount computation processing according to the first embodiment.

The free resource amount computation processing is started, for example, at the time of detection of registration of a new job, at the time of detection of delay of job execution, at the time of detection of a considerable change in a load of a data transfer path of a job which is being executed, or at any timing. The free resource amount computation processing may be executed in a change order with requested resource amount computation processing to be described below or may be simultaneously executed.

In step S901, the free resource amount computation program 900 (strictly speaking, the CPU 211 executing the free resource amount computation program 900) acquires an entry related to a predetermined job from the registered job information table 810. For example, the "predetermined job" may be a newly registered job (a registered job) serving as a trigger for starting the free resource amount computation processing, a job of which delay is detected in processing, one of jobs in which a load of a data transfer path is considerably changed, or any job.

In step S902, the free resource amount computation program 900 acquires path information related to the identifier stored in the data source 815 and the output 816 of the entry acquired in step S901, that is, path information for accessing data (for example, a table) of the identifier, from the path information table 320 of the configuration information storage unit 300.

After step S902, the free resource amount computation program 900 repeats the processing (step S903 to S906) of loop 1 with each of the path information acquired in step S902 as a processing target. Here, the path information of the processing target is referred to as target path information.

In step S903, the free resource amount computation program 900 acquires all of the entries related to the components from the component information table 310 of the configuration information storage unit 300 based on the IDs (the network I/F ID, the network ID, the I/O port ID, and the volume ID) of the components indicated by the entry of the target path information. The entry related to the component includes information regarding the maximum performance value of the component.

In step S904, the free resource amount computation program 900 acquires the entry of the load information in the load information table with reference to the load information table related to the components of the load information storage unit 400 based on the IDs (the network I/F ID, the network ID, the I/O port ID, and the volume ID) of the components indicated by the entry of the target path information, and derives a load of each monitoring metric type of each component. At this time, the acquired entry is an entry in which the time 401 is a latest entry and may be a value of a load. For example, all of the entries in which the time 401 is included in a predetermined period may be acquired, and an average value, a maximum value of the values of the loads, or a value obtained by adding a standard deviation to the average value may be the value of the load. A future load may be predicted from the load during the predetermined period using a known load prediction algorithm or the like and a value of the predicted load may be the value of the load of each component.

In step S905, the free resource amount computation program 900 computes a free resource amount of each monitoring metric type of each component by subtracting the value of the corresponding load derived in step S904 from the maximum performance value of the maximum performance value 313 for all of the entries of the component information table 310 acquired in step S903.

In step S906, the free resource amount computation program 900 stores the free resource amounts of all pairs of components and monitoring metric types computed in step S905. For example, the free resource amount may be stored in the memory 212.

A specific example of the free resource amount computation processing is as follows. For example, as indicated in the input screen 51110 of FIG. 8, when the job A is newly registered, the free resource amount computation program 900 acquires the entry 8001 of the registered job information table 810 in step S901. Subsequently, the free resource amount computation program 900 acquires 999 entries 3201 to 3202 and one entry 3204 in the path information table 320 based on values "DB1_Table1 to DB1_Table999" of the data source 815 and values "DB3_Table1" of the output 816 in the entry 8001 (step S902).

Subsequently, the free resource amount computation program 900 executes the processing (steps S903 to S906) of loop 1 with each of the acquired 1000 entries as processing targets. For example, when the entry 3201 is selected as the processing target, the free resource amount computation program 900 acquires entries from the component information table 310 using each of the component ID "network I/F 121a", "network 140", "I/O port 131a", and "volume 132a" stored in the entry 3201 as a key in step S903. For example, when "I/O port 131a" is used as a key, the free resource amount computation program 900 acquires the entries 3101 and 3102.

In step S904, the free resource amount computation program 900 acquires entries from the corresponding load information table of the load information storage unit 400 using the component ID stored in the entry 3201 as a key. For example, when "I/O port 131a" is used as a key and a latest load is a value of a load on the component, the free resource amount computation program 900 acquires an entry 4104 of the load information table 410 and an entry 4204 of the load information table 420. For example, when the free resource amount of the received transfer rate of the I/O port 131a is computed, the free resource amount computation program 900 sets 8.0 Gbps obtained by subtracting "2.0 Gbps" of the entry 4104 from "10 Gbps" which is a maximum performance value of the entry 3101 as a free resource amount in step S905 and stores a pair of received transfer rate of the I/O port 131a and the free resource amount in step S906.

In the embodiment, in each processing, unnecessary data is acquired or computed in some cases for description. For example, when the job execution server 110 computes a free resource amount in processing for reading data from the volume, only the free resource amount of the transmitted transfer rate of the I/O port 131 may be computed. In the embodiment, however, a free resource amount of the received transfer rate is also inclusively computed. The acquisition or computation of the unnecessary data may be reduced as necessary.

<Requested Resource Amount Computation Processing>

The requested resource amount computation processing is processing executed by allowing the CPU 211 to execute the requested resource amount computation program 1000 of the management computer 200 and is processing for computing a resource amount requested for each component (a requested resource amount) per processing unit in which the process executed by the registered job can be parallelized (per parallel processing unit).

Figure 11:
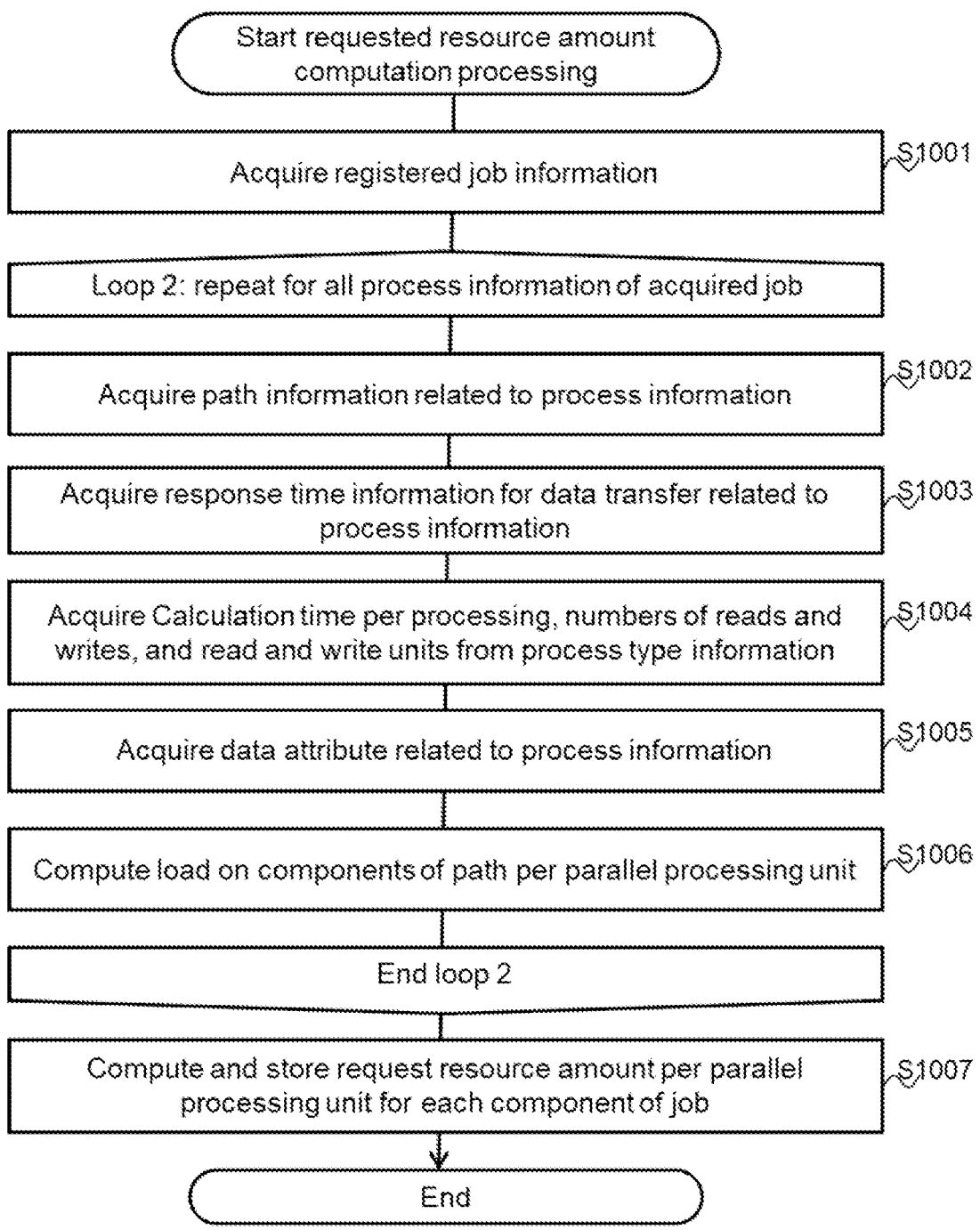
FIG. 11 is a flowchart illustrating a requested resource amount computation processing according to the first embodiment.

FIG. 11 is a flowchart illustrating the requested resource amount computation processing according to the first embodiment.

The requested resource amount computation processing may be started when completion of the free resource amount computation processing is detected. The requested resource amount computation processing may be executed in change order with the free resource amount computation processing or may be simultaneously executed. In this case, the requested resource amount computation processing may be started, for example, at the time of detection of registration of a new job, at the time of detection of delay of job execution, at the time of detection of a considerable change in a load of a data transfer path of a job which is being executed, or at any timing.

In step S1001, the requested resource amount computation program 1000 (strictly speaking, the CPU 211 executing the requested resource amount computation program 1000) acquires an entry (job information) related to a predetermined job from the registered job information table 810. For example, the predetermined job may be a job serving as a trigger for starting the free resource amount computation processing.

After step S1001, the requested resource amount computation program 1000 repeats the processing (steps S1002 to S1006) of loop 2 with information regarding all the processes (process information) that the job information acquired in step S1001 has as a processing target. Here, the process information of the processing target is referred to as target process information.

In step S1002, the requested resource amount computation program 1000 acquires the path information regarding the identifier stored in the data source 815 and the output 816 of the target process information, that is, the path information for accessing data of the identifier, from the path information table 320 of the configuration information storage unit 300.

In step S1003, the requested resource amount computation program 1000 acquires a response time for the data of the data source 815 or the output 816 of the target process information from the response time information table 510. The acquired response time may be, for example, a latest response time for the data related to the identifier of the data source 815 or the output 816 in the response time information table 510. After the start of the requested resource amount computation process, the response time may be acquired by measuring the response time for the data related to the identifier of the data source 815 or the output 816.

In step S1004, the requested resource amount computation program 1000 acquires corresponding entries (the calculation time per one processing, the read unit, the write unit, the number of reads, and the number of writes) from the process type information table 710 based on the process type ID of the process type ID 813 of the target process information.

In step S1005, the requested resource amount computation program 1000 acquires a data attribute of the data related to the value of the data source 815 of the target process information, that is, the data capacity from the data attribute information table 610.

In step S1006, the requested resource amount computation program 1000 computes a load per parallel processing unit of the process on each component of the path information acquired in step S1002 in consideration of a direction of data transfer based on the response time acquired in step S1003, the information (the calculation time per one processing, the read unit, the write unit, the number of reads, and the number of writes) regarding the entries acquired in step S1004, and the data capacity acquired in step S1005. For example, when a load (bandwidth) of the I/O port 131$a$ is computed, the load may be computed with the following expressions (1) and (2).

$$\text{Load (Gbps) of transmitted transfer rate of I/O port } 131a \text{ per parallel processing unit} = (\text{average value of read data capacity} \times \text{number of reads}) / (\text{response time of read data} \times \text{number of reads} + \text{calculation time per one processing} + \text{response time of write data} \times \text{number of writes}) \quad (1)$$

$$\text{Load (Gbps) of received transfer rate of I/O port } 131a \text{ per parallel processing unit} = (\text{average value of write data capacity} \times \text{number of writes}) / (\text{response time of read data} \times \text{number of reads} + \text{calculation time per one processing} + \text{response time of write data} \times \text{number of writes}) \quad (2)$$

Here, the average value of the read data capacity may be an average value of the read data per parallel processing unit computed based on the data source 815 and the reading unit 713. The average value of the write data capacity may be computed and obtained from the average value of the read data capacity and may be computed with, for example, the following expression (3).

$$\text{Average value of write data capacity} = \text{read data capacity average value} \times \text{number of reads/number of writs} \quad (3)$$

When a table is converted into a file, a compression rate at the time of conversion of a general table into a file may be applied to the data capacity in the table. When a part of the read data is extracted and written, a reduction rate (including a predicted value) may be applied.

As for the above-described expressions (1) and (2), it is assumed that the data transfer paths for reading or writing data are the same. For example, when data is read along the two data transfer paths and a ratio of the number of pieces of data passing through two I/O ports is 3:2, a value obtained by multiplying 3/5 and 2/5 to "a load on an up-stream transfer rate of the network 140 per parallel processing unit" computed with the above-described expression (1) may be computed. When the paths of the data transfer for reading or writing is different, an average value of the read data capacity or an average value of the write data capacity may be computed and used for each path.

In step S1007, the requested resource amount computation program 1000 computes the requested resource amount for each component per parallel processing unit of the job acquired in step S1001 and stores the requested resource amount in the memory 212 or the like. For example, when the number of processes of the job is one, the load on each component per parallel processing unit of the process computed in step S1006 may be set as the requested resource amount. On the other hand, for example, when the job includes a plurality of processes executed in parallel, the load in the plurality of processes computed in step S1006 may be added to obtain the requested resource amount. For example, when there are a plurality of processes executed in sequence in the job, the maximum value of the load in the plurality of processes computed in step S1006 may be set as the requested resource amount. When the job includes a plurality of processes executed in parallel and a plurality of processes executed in sequence, the value of added load and the maximum value of the load may be combined to compute the requested resource amount.

A specific example of the requested resource amount computation processing is as follows. For example, as indicated in the input screen 51110 of FIG. 8, when the job A is newly registered, the requested resource amount computation program 1000 acquires the entry 8001 of the registered job information table 810 in step S1001. Subsequently, the requested resource amount computation program 1000 repeats the processing (steps S1002 to S1006) of loop 2 by the number of acquired entries.

In step S1003, the requested resource amount computation program 1000 acquires 999 entries 3201 to 3202 and one entry 3204 of the path information table 320 based on values "DB1_Table1 to DB1_Table999" of the data source 815 and values "DB3_Table1" of the output 816 in the entry 8001 (step S1003).

Subsequently, the requested resource amount computation program 1000 acquires a read response time of 3 ms (3 milliseconds) of DB1 and a write response time of 10 ms on DB3_Table1 with reference to the entries 5001 and 5003 from the response time information table 510 based on the values "DB1_Table1 to DB1_Table999" of the data source 815 and the value "DB3_Table1" of the output 816 of the entry 8001 in the registered job information table 810 (step S1003).

In step S1004, the requested resource amount computation program 1000 acquires the entry 7001 from the process type information table 710 based on the process type "Table_to_Table_Extract_Column" of the entry 8001. In step S1005, the requested resource amount computation program 1000 acquires the data capacity of the data corresponding to the values "DB1_Table1 to DB1_Table999" of the data source 815 of the entry 8001 from the data attribute information table 610 and computes the average value (in this example, for example, 70 MB).

In step S1006, the requested resource amount computation program 1000 computes a load of each component stored in the path information (the entries 3201 and 3202) acquired in step S1002.

For example, a load of the received transfer rate (Gbps) in one parallel processing unit of the I/O port 1131a which is one of the component of the data transfer path at the time of reading of DB1_Table1 to DB1_Table999 can be computed as (70 MB×1)/(3 milliseconds×1+30 milliseconds+10 milliseconds×1)≈1.6 Gbps from Expression (1). Then, the requested resource amount computation program 1000 stores the requested resource amount as "1.6 Gbps" of the received transfer rate of the I/O port 131a, for example, (step S1007).

<Maximum Parallel Number Computation Processing>

The maximum parallel number computation processing is processing executed by allowing the CPU 211 to execute the maximum parallel number computation program 1100 and is processing for computing a maximum parallel number of the job in which each component does not undergo a bottleneck based on the free resource amount of each component computed in the free resource amount computation processing and the requested resource amount of the job for each component computed in the requested resource amount computation processing.

Figure 12:
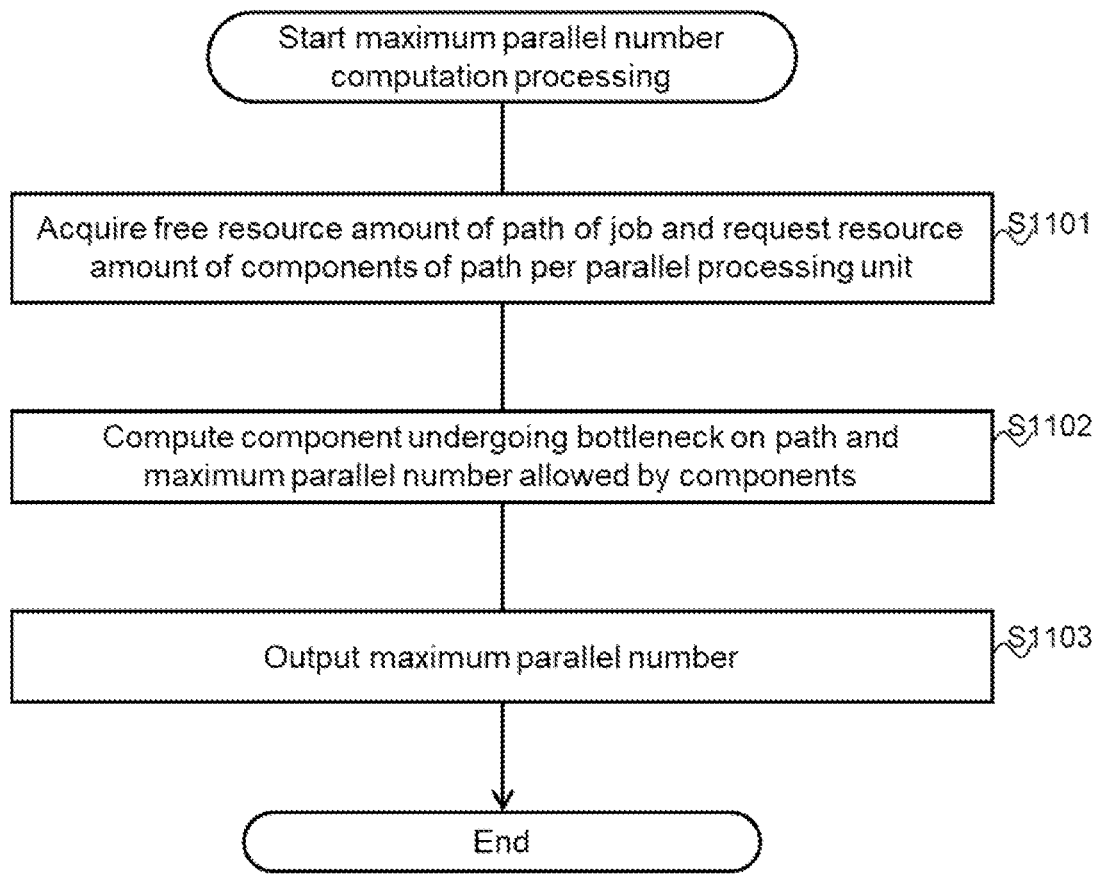
FIG. 12 is a flowchart illustrating a maximum parallel number computation processing according to the first embodiment.

FIG. 12 is a flowchart illustrating maximum parallel number computation processing according to the first embodiment.

The maximum parallel number computation processing is started, for example, when completion of the free resource amount computation processing and the requested resource amount computation processing is detected.

In step S1101, the maximum parallel number computation program 1100 (strictly speaking, the CPU 211 executing the maximum parallel number computation program 1100) acquires a free resource amount of each component on a path of the registered job computed and stored in the free resource amount computation processing and the requested resource amount of each component per parallel processing unit stored in the requested resource amount computation processing.

In step S1102, when the parallel number of the job is increased gradually, the maximum parallel number computation program 1100 specifies the components in which a free resource amount run short with the smallest parallel number based on the free resource amount of each component and the requested resource amount of each component per parallel processing unit, computes the maximum parallel number in a case in which the free resource amount of the components run shorts, and sets the parallel number as a maximum parallel number of the job. For example, the maximum parallel number may be a maximum integer value which does not exceed a minimum value among values obtained by calculating (the free resource amount/requested resource amount) for each of the components on the path.

In step S1103, the maximum parallel number computation program 1100 outputs the maximum parallel number computed in step S1102 to the display unit 5100.

A specific example of the maximum parallel number computation processing is as follows. For example, in step S1101, the maximum parallel number computation program 1100 receives the free resource amount of each component of the path computed in the free resource amount computation processing and the requested resource amount of each component of the path of the registered job computed in the requested resource amount computation processing. In step S1102, the maximum parallel number computation program 1100 computes the maximum parallel number allowed by the I/O port 131a to 8.0/1.6=5, for example, when the free resource amount of the I/O port 131a is 8.0 Gbps and the requested resource amount is 1.6 Gbps. The parallel number of 5 means that the parallel number of the registered job is allowed up to 5. Further, the maximum parallel number computation program 1100 also executes similar computation on the other components of the path. Here, the component allowing the smallest parallel number undergoes a bottleneck and the allowed parallel number of the component is a maximum parallel number in the data analytics platform. Accordingly, the maximum parallel number computation program 1100 computes the maximum parallel number from the allowed parallel number of the component undergoing the bottleneck. In step S1103, the maximum parallel number computation program 1100 displays, for example, an output screen (for example, see FIG. 13) including the maximum parallel number on the display unit 51200.

<Output Screen 51210>

FIG. 13 is a diagram illustrating an example of an output screen according to the first embodiment. The output screen illustrated in FIG. 13 shows an example of a case in which the output screen is implemented by a GUI.

An output screen 51210 includes a display area 51211 in which a job name of a registered job is displayed and a display area 51212 in which a recommended parallel processing number of the job is displayed. In the display area 51212, the maximum parallel number computed in the maximum parallel number computation processing is displayed.

For example, the output screen 51210 in FIG. 13 indicates that the parallel number of "20" is recommended in the execution of the processing of "job A".

In the foregoing embodiment, the maximum parallel number is displayed on the output screen 51210. For example, the management computer 200 may have a function of configuring the job execution server 110 so that the job is executed with the maximum parallel number computed in the maximum parallel number computation processing.

As described above, according to the first embodiment, for example, when the job is executed, the maximum parallel number of the job in which each component does not undergo a bottleneck can be computed based on the maximum performance value and the loads of the components on the path along which the data transfer of the job is executed. Thus, it is possible to appropriately determine the parallel processing number in which the processing end time of the job is the shortest and a billing amount of a computer in the public cloud environment 101 decreases.

In the first embodiment, the example in which it is assumed that the parallel number of the process executed by the job is maintained as the parallel number set at any time in the execution of the job has been described. However, in particular, immediately after the job is started, the actual ETL processing may not be executed with the set parallel number due to the processing load or the like for the start.

Here, a change in the requested resource amount in the job will be described.

FIG. 14 is diagram illustrating changes in requested resource amounts of jobs. FIG. 14(a) illustrates a change in an ideal requested resource amount of a job in the first embodiment and FIG. 14(b) illustrates a change in a general requested resource amount of a job.

For example, in the first embodiment, as shown in a graph 51301, it is assumed that the requested resource amount ideally increases by the parallel number of the job with start of the job and decreases with end of the job. Actually, however, as shown in a graph 51302, the requested resource amount gradually increases at the time of start of the job and gradually decreases at the time of approach to end of the job. As for this, the maximum parallel number may be computed by learning a change in the requested resource amount, as shown in the graph 51302, for each process type through machine learning or the like, generating a model capable of deriving the parallel number and a peak value of the requested resource amount, and obtaining the parallel number at the peak value of the requested resource amount. For example, a model that has at least a response time of data transfer based on the process type, a processing computation time per parallel processing unit of the process, the number of reads, the number of writes, a read data capacity computed from the data capacity of the read data and the read unit, a read data capacity computed from the data capacity of the written data and the write unit, and a parallel number as feature amounts and computes the requested resource amount (or the peak value of the requested resource amount) may be generated, and the maximum parallel number may be computed using this model.

In the first embodiment, only the maximum parallel number of the registered job is displayed on the output screen 51210, but may be displayed with a predicted end time of the job in the case of execution with the maximum parallel number. As a method of computing the predicted end time of the job, a method of computing the predicted end time in end time prediction processing (see FIG. 18) of a second embodiment to be described below may be used.

In the first embodiment, the recommended parallel number of the job is computed and displayed, but a specification of the job execution server or the like executing the job may be determined based on the computed recommended parallel number. For example, the load on the job execution server 110 per parallel processing unit may be measured and stored for each process type, a load on the job execution server 110 with the recommended parallel number may be computed, and a specification (performance) of the job execution server 110 may be determined so that the load is satisfied.

In the first embodiment, the example in which one RDBMS server 120 is used for one DB has been described, but the RDBMS servers 120 may be clustered. In this case, for the information regarding the components stored in the component information table 310, all the clustered RDBMS servers 120 may be treated as one server. For example, the maximum performance value of the network I/F 153 may be a value obtained by adding the maximum performance values of the network I/Fs 153 of all the clustered RDBMS servers 120. When the number of servers can be changed automatically with the autoscale function in the RDBMS server 120, the maximum performance value may be a value obtained by adding the performance values of the components of all the servers in the maximum values of the changeable number of servers.

In the first embodiment, the data for which the ETL processing is executed is the RDB data, but the data is not limited thereto. The data may be data with a file format or an object format. The data may be stored and managed in a file server or an object storage.

In the first embodiment, the main components may become a bottleneck in the hybrid cloud environment including the public cloud environment 101 and the on-premise environment 102 are the components related to the data transfer. Therefore, the maximum parallel number is derived based on the request load and the maximum performance value of the transfer rate of the components related to the data transfer. However, for example, the maximum parallel number may be computed including the load of the CPU of the server, the load of the processor of the storage device, or the like. The transfer rate (for example, a transfer data amount of 1 second) has been exemplified as the monitoring metric type, but the present disclosure is not limited thereto. The IOPS (an IO number per 1 second) may be used. Further, when the load or the maximum performance value can be computed, another component and monitoring metric type may be included.

In the first embodiment, the maximum parallel number is determined for the job. However, when the data analytics platform 100 can change the parallel number in the process unit during execution of the job, the maximum parallel number may be determined for each process by executing the same processing for each process unit. In this case, the maximum parallel number of each process may be displayed on the output screen 51210.

In the first embodiment, the registered job is executed immediately at the time of registration as an example, however, this may be started, for example, at a designated time in accordance with a scheduler function or the like. In this case, the load of each component used in the free resource amount computation processing or the value of the response time used in the requested resource amount computation processing may be computed using a predicted load or a predicted response time predicted from past load information, information regarding another scheduled job, or a response time, or the maximum parallel number may be recomputed by executing each processing immediately before the execution of the job.

In the first embodiment, the identifier for identifying the data group classified and divided so that the data analyst can use it is the same as the identifier of the storage destination of the data, but the present invention is not limited thereto. The identifier for identifying the data group and the identifier of the storage destination may be different identifiers and may be managed in association, and a correspondence relation may be specified.

In the first embodiment, the example in which the requested resource amount computation processing is executed immediately before the maximum parallel number computation processing has been described. However, for example, in the case of an environment in which a change in a response time of data reading and writing is small, the requested resource amount computation processing may be executed at the time of registration of the job and the requested resource amount per parallel processing unit may be stored. Thereafter, the maximum parallel number computation processing may be executed using the stored requested resource amount.

In the first embodiment, the description has been made assuming that the parallel number of the job cannot be changed during the execution of the job. However, the parallel number may be changed during the execution of the process. In this case, for example, at a time point at which another job or another process is completed, the maximum parallel number may be computed by executing the free resource amount computation processing, the maximum parallel number computation processing, and the like described above.

In the first embodiment, it is assumed that the data of one unit is read for one parallel processing unit. However, depending on an ETL platform, the data allocated by each of the job execution servers parallelized before the execution of the process is collectively read when one process is executed. To correspond to such a platform, characteristics of the platform may be taken into consideration in the computation when the requested resource amount per parallel processing unit is computed. For example, when the load of the transmitted transfer rate of the I/O port 131a per parallel processing unit is computed, "calculation time per one processing" executed by the process may be excluded in the computation.

Second Embodiment

Next, a data analytics platform management system according to a second embodiment will be described. In the following description, differences from the first embodiment will be described and description of similar components, programs that have similar functions, and tables that have similar items will be omitted or simplified using the same reference symbols.

In the data analytics platform management system 1 according to the first embodiment, the parallel number of the job of the ETL processing is determined in accordance with the load of the data analytics platform 100. In the first embodiment, at the time of new execution of a job in certain ETL processing, the parallel number of the new job considerably decreases (for example, the parallel number becomes 1) in some cases when resources of one component of the data analytics platform are used to the maximum by another job. However, processing is earlier completed in some cases when the resources of the data analytics platform 100 are used to the maximum after waiting for the completion of another job rather than the execution in the small parallel number.

Accordingly, the data analytics platform management system according to the second embodiment predicts an end time of the job in another ETL processing, and determines whether the registered job is executed at a designated time or executed after awaiting completion of another job when executing a certain registered job.

In the management computer 200 according to the second embodiment, the registered job information storage unit 800 stores a registered job information table 850 instead of the registered job information table 810. The management computer 200 stores a maximum parallel number computation program 1110 instead of the maximum parallel number computation program 1100.

<Registered Job Information Storage Unit 800>

The registered job information storage unit 800 stores the registered job information table 850.

FIG. 15 is a diagram illustrating a configuration of a registered job information table according to the second embodiment. The same reference symbols are given to the same fields as those of the registered job information table 810 and description thereof will be omitted.

To store information regarding a job of the ETL processing registered by a data analyst, an entry of the registered job information table 850 includes fields of the job ID 811, the process ID 812, the process type ID 813, the parameter 814, the data source 815, the output 816, the start time 851, a predicted end time 852, and a parallel number 853. In the start time 851, a time at which execution of the job is started (a start time) is stored. In the predicted end time 852, a value indicating a predicted end time of the job (a predicted end time) is stored. In the parallel number 853, a parallel number in the job which is being executed or scheduled to be executed is stored.

For example, an entry 14001 of the registered job information table 850 indicates that the registered job A is started at 00:00 Jan. 1, 2020, a predicted end time is 12:00 Jan. 1, 2020, and the job is executed with the parallel number of 20.

<Maximum Parallel Number Computation Processing>

The maximum parallel number computation processing is processing executed by allowing the CPU 211 to execute the maximum parallel number computation program 1110 of the management computer 200 and includes processing for computing a maximum parallel number and a predicted end time when the registered job is started after a predicted end time of each of other jobs and computing a start time, a predicted end time, and a parallel number so that the predicted end time is earliest.

Figure 16:
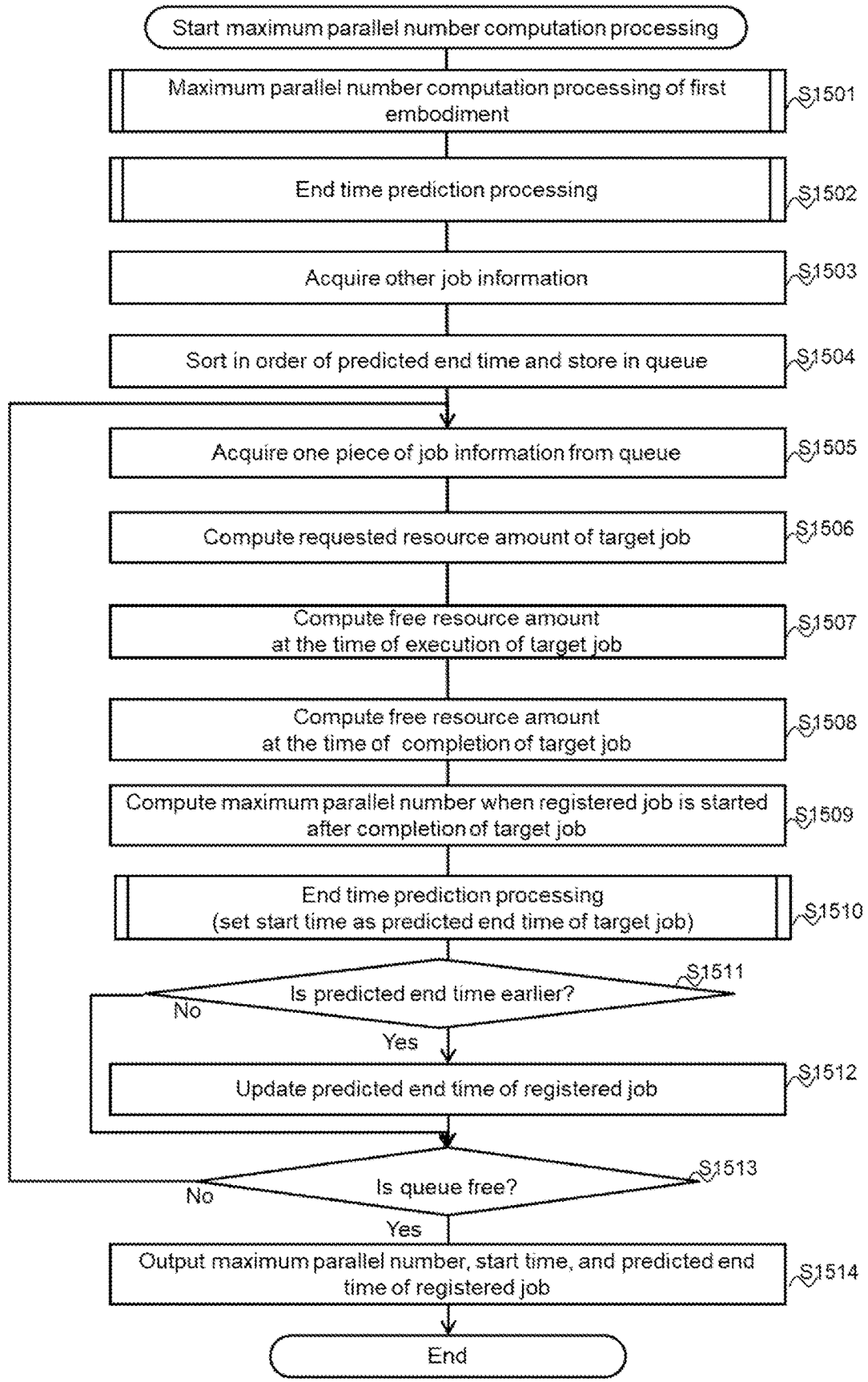
FIG. 16 is a flowchart illustrating a maximum parallel number computation processing according to the second embodiment.

FIG. 16 is a flowchart illustrating maximum parallel number computation processing according to the second embodiment.

The maximum parallel number computation processing is executed, for example, when completion of the free resource amount computation processing and the requested resource amount computation processing is detected.

In step S1501, the maximum parallel number computation program 1110 executes the maximum parallel number computation processing of the first embodiment (see FIG. 12).

Figure 18:
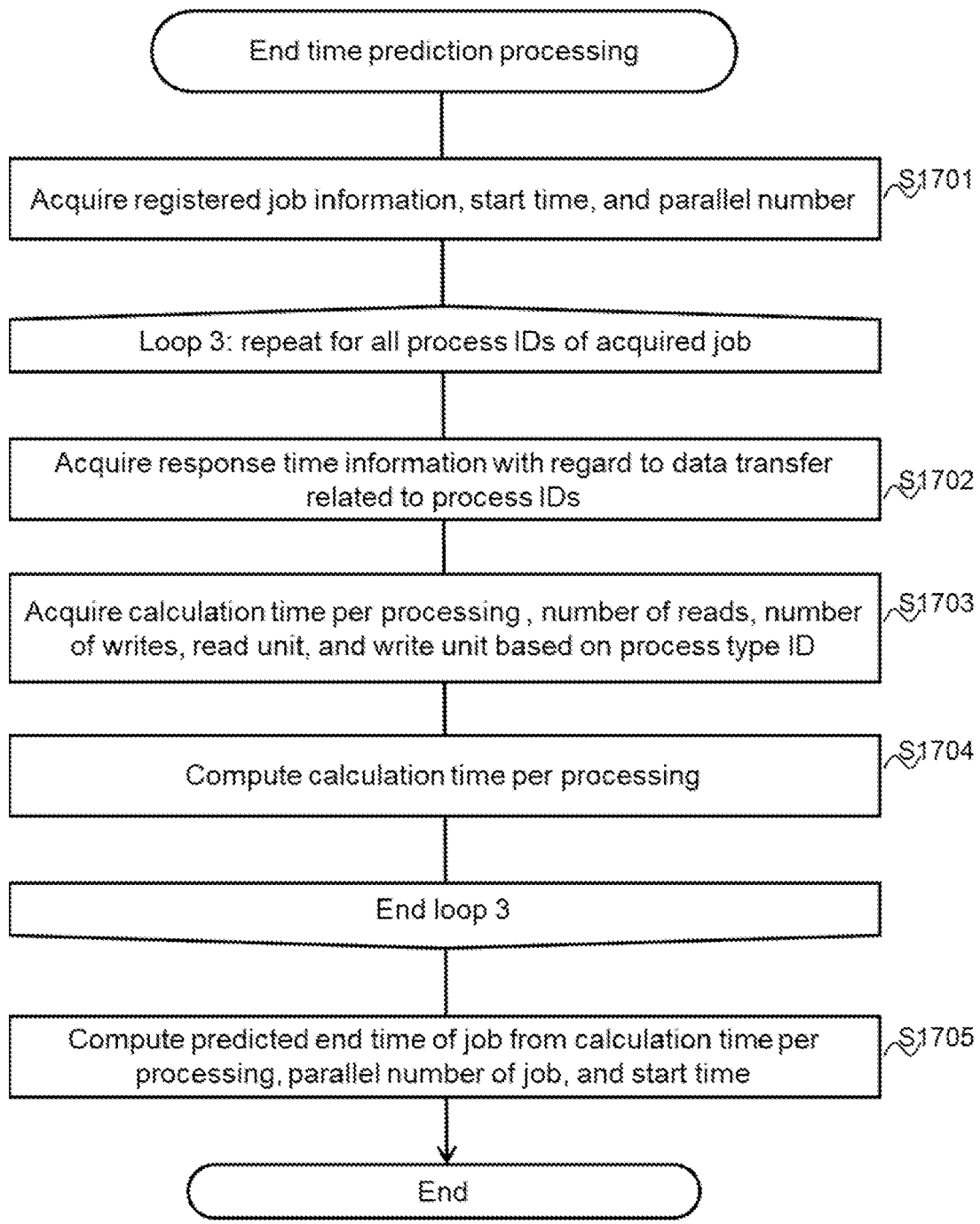
FIG. 18 is a flowchart illustrating an end time prediction processing according to the second embodiment.

In step S1502, the maximum parallel number computation program 1110 predicts and stores a predicted end time with regard to the registered job acquired in step S901 of the free resource amount computation processing at the time of execution with the parallel number computed in step S1102 at a certain start time (for example, a time designated by the data analyst, a current time, or any time) by executing the end time prediction processing (see FIG. 18).

In step S1503, the maximum parallel number computation program 1110 acquires other job information from the registered job information table 850. Here, the acquired other job information may be limited to a job executed during the same period. The same period indicates, for example, a case in which a period indicated by a predicted end time from a start time of the registered job overlaps a period indicated by a predicted end time from a start time of the other job. The job acquired here may be limited to a job overlapping in a path of the data transfer with the registered job.

In step S1504, the maximum parallel number computation program 1110 sorts information regarding the other job acquired in step S1503 in order of the predicted end time and stores the information in a queue. The queue may be stored, for example, on the memory 212.

In step S1505, the maximum parallel number computation program 1110 acquires one piece of job information from the queue. Here, the job of the acquired job information is referred to as a target job.

In step S1506, the maximum parallel number computation program 1110 computes the requested resource amount at the time of execution of the target job. For example, the maximum parallel number computation program 1110 calls the requested resource amount computation program 1000 to compute the requested resource amount per parallel processing unit of the target job, acquires the parallel number of the parallel number 853 of the job information from the registered job information table 850, and computes the requested resource amount in the following Expression (4).

Requested resource amount=(requested resource amount per parallel processing unit)×(parallel number)     (4)

In the embodiment, the requested resource amount for one job is constant in the whole job. For example, when a job includes a plurality of processes executed in sequence, the requested resource amount may be computed for each process.

In step S1507, the maximum parallel number computation program 1110 computes the free resource amount at the time of execution of the target job. For example, the maximum parallel number computation program 1110 calls the free resource amount computation program 900 to compute the free resource amount. When a start time of the target job is later than a current time, the requested resource amount of another job executed after the start time may be computed and set to a load and the free resource amount may be computed. Alternatively, the load after the start time may be predicted using a known load prediction algorithm and the free resource amount may be computed using the predicted load.

In step S1508, the maximum parallel number computation program 1110 subtracts the requested resource amount of the target job computed in step S1506 from the free resource amount at the time of execution of the target job computed in step S1507 to compute the free resource amount of each component at the time of completion of the target job.

In step S1509, the maximum parallel number computation program 1110 computes the maximum parallel number at the time of starting of the registered job after the completion of the target job. The maximum parallel number may be computed through the same processing as the maximum parallel number computation processing of the first embodiment based on the free resource amount at the time of completion of the target job in step S1508 and the requested resource amount per parallel processing unit of the registered job computed by the requested resource amount computation program 1000.

In step S1510, the maximum parallel number computation program 1110 computes the predicted end time when the predicted end time of the target job is set as the start time of the registered job, through the end time prediction processing (see FIG. 18).

In step S1511, the maximum parallel number computation program 1110 determines whether the predicted end time computed in step S1510 is earlier than the predicted end time stored in step S1502. When the result of the determination is true (Yes in S1511), the maximum parallel number computation program 1110 causes the processing to proceed to step S1512. When the result of the determination is false (No in S1511), the maximum parallel number computation program 1110 causes the processing to proceed to step S1513.

In step S1512, the maximum parallel number computation program 1110 updates the predicted end time of the registered job stored in step S1502 to the predicted end time computed in step S1510.

In step S1513, the maximum parallel number computation program 1110 determines whether the queue is empty. When the result of the determination is true (Yes in S1513), the maximum parallel number computation program 1110 causes the processing to proceed to step S1514. When the result of the determination is false (No in S1513), the maximum parallel number computation program 1110 causes the processing to proceed to step S1505.

In step S1514, the maximum parallel number computation program 1110 outputs, to the display unit 51200, an output screen 51220 (see FIG. 19) including a set of the predicted end time of the registered job stored in step S1502 or S1512, the maximum parallel number at the time of storing of the predicted end time, and the start time used in step S1502 or S1510 at the time of storing of the predicted end time.

Here, essence of the processing from S1502 to S1514 in the maximum parallel number computation processing will be described.

Figure 17:
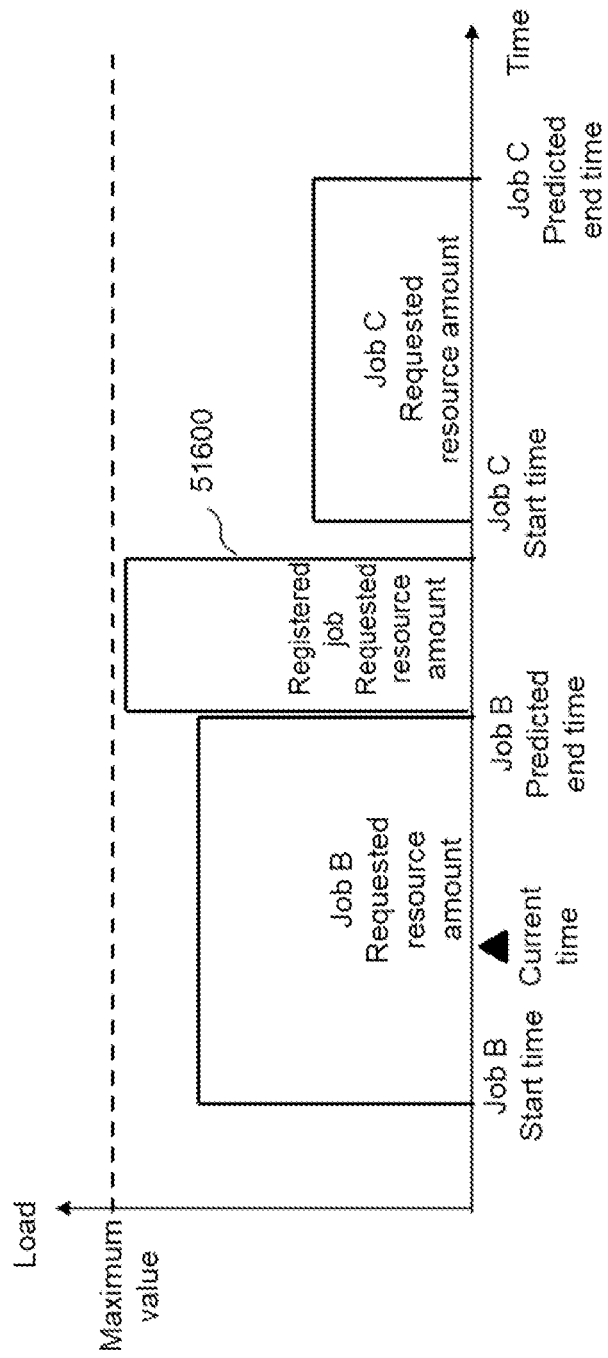
FIG. 17 is a diagram illustrating the essence of the maximum parallel number computation processing according to the second embodiment.

FIG. 17 is a diagram illustrating essence of the maximum parallel number computation processing according to the second embodiment.

Processing for outputting the start time, the predicted end time, and the parallel number in steps S1502 to S1514 by the maximum parallel number computation program 1110 corresponds to processing for searching for a location of a rectangle (for example, a graph 51600 of FIG. 17) indicating an execution period of the registered job in which the maximum performance value of each component of the data analytics platform 100 is not exceeded and the predicted end time is the earliest among rectangles defined by a load of each component of other jobs (jobs B and C) and execution periods of jobs, as illustrated in FIG. 17. The processing for searching for the location of the rectangle indicating the execution period of the registered job is not limited to the foregoing processing. For example, the maximum parallel number, the start time, and the predicted end time in the case of execution of the registered job for each section with respect to time may be computed and an optimum section may be derived.

In the second embodiment, the other jobs started after the start time of the registered job and before the predicted end time have not been described. However, loads of these jobs may be predicted and the maximum parallel number of the registered job may be computed.

Priorities of jobs may be set and when the priority of another job is low, the maximum parallel number may be computed without including a load of the job.

In the second embodiment, as shown the graph 51301 of FIG. 14, computation is exemplified assuming that the requested resource amount ideally increases by the parallel number of the job with start of the job and decreases with end of the job. Actually, however, as shown in the graph 51302 of FIG. 14, the requested resource amount gradually increases and gradually decreases. Here, as in the graph 51301, a parallel number smaller by a predetermined ratio (for example 20%) smaller than the parallel number may be set as the maximum parallel number of the job between start of the job and end of the job, rather than the parallel number with which the maximum requested resource amount is set. In this way, maximum processing efficiency slightly decreases, but an unnecessary resource amount which is reserved though it is not used can be reduced immediately after the start of the job or immediately before the end of the job.

<End Time Prediction Processing>

The end time prediction processing is processing executed by allowing the CPU 211 to execute the maximum parallel number computation program 1110 and is processing for computing a predicted end time of the registered job with regard to a designated start time and parallel number.

FIG. 18 is a flowchart illustrating end time prediction processing according to the second embodiment.

The end time prediction processing is executed in steps S1502 and S1510 of the maximum parallel number computation processing.

In step S1701, the maximum parallel number computation program 1110 acquires the designated registered job information, the start time, and the parallel number of the job.

After step S1701, the maximum parallel number computation program 1110 executes the processing (steps S1702 to S1704) of loop 3 with the process IDs of all the process IDs 802 of the registered job acquired in step S1701 as processing targets. Here, the process ID of the processing target is referred to as a target process ID.

In step S1702, the maximum parallel number computation program 1110 acquires the response time of the data indicated by the value of the data source 815 or the output 816 of the target process ID from the response time information table 510. The acquired response time may be, for example, a latest response time related to the value of the data source 815 or the output 816 or may be a response time measured after the end time prediction processing is started.

In step S1703, the maximum parallel number computation program 1110 acquires a related entry (the calculation time per one processing, the read unit, the write unit, the number of reads, and the number of writes) from the process type information table 710 based on the process type ID of the process type ID 813 related to the target process ID.

In step S1704, the maximum parallel number computation program 1110 computes the processing time per parallel processing unit of the process based on the response time acquired in step S1702 and the calculation time per one processing, the read unit, the write unit, the number of reads, and the number of writes of the entry acquired in step S1703. For example, the processing time per parallel processing unit of the process is computed with the following Expression (5).

$$\text{Processing time per parallel processing unit of process}=(\text{response time of read data}\times\text{number of reads}+\text{calculation time per one processing}+\text{response time of write data}\times\text{number of writes}) \quad (5)$$

In step S1705, the maximum parallel number computation program 1110 computes the predicted end time of the job based on the processing time per parallel processing unit of each process computed in the processing (S1702 to S1704) of loop 3, the start time, and the parallel number. For example, the predicted end time is computed with the following Expression (6).

$$\text{Predicted end time}=\text{start time}+\text{processing time of job} \quad (6)$$

The processing time of the job is computed with the following Expression (7).

$$\text{Processing time of job}=\Sigma(\text{process})\{\text{processing time per parallel processing unit of process}\times\text{number of pieces of read data}\}/(\text{parallel number}\times\text{number of reads})\} \quad (7)$$

The number of pieces of read data may be the number of times the data is transferred from the storage device, which can be computed based on the read unit of the read unit 713 of the process type information table 710 and the value of the data source 815 of the registered job information table 850.

A specific example of the end time prediction processing is as follows. For example, the maximum parallel number computation program 1110 acquires the job A indicated by the entry 8001 of the registered job information table 810, a start time 12:00 Jan. 1, 2020, and the parallel number of 5 as an input in step S1701, and repeats the processing (steps S1702 to S1704) of loop 3. In the processing of loop 3, the maximum parallel number computation program 1110 acquires the response time of 3 milliseconds of the data transfer of the data indicated by the data source 815 and the response time of 10 milliseconds of the data transfer of "DB3_Table1" indicated by the output 816 with regard to the process ID "process a" of the entry 8001 from the response time information table 510 (step S1703). In step S1703, the maximum parallel number computation program 1110 acquires the entry 7001 in which the process type ID is "Table_to_Table_Extract_Column" from the process type information table 710 and acquires the calculation time per one processing of "30 milliseconds", the number of reads "1", the number of writes "1", the read unit "1 table", and the write unit "1 table". In step S1704, the maximum parallel number computation program 1110 computes the processing time per parallel processing unit=(3 milliseconds×1+30 milliseconds+10 milliseconds×1)=43 milliseconds.

In step S1705 after the processing of loop 3, Since the read unit is 1 table and the data source is 1 to 999 tables, the maximum parallel number computation program 1110 computes that the number of pieces of read data is 999 and computes the processing time of the job=(43 milliseconds× 999)/(5×1)≈8.5 seconds.

In the second embodiment, the example in which only the processing time applied to each process is computed as the processing time of the job computed in step S1705 has been described. However, actually, because the start time of the job or a time of pre-processing or the like is necessary in execution of the job, such a time may be inclusively computed.

In the second embodiment, computation is exemplified assuming that the parallel number of the process executed by the job is maintained as the parallel number set at any time. In the actual ETL processing, however, in particular, immediately after the job is started, the process is not executed with the designated parallel number due to the processing load or the like for start in some cases. That is, actually, as shown in the graph 51302 of FIG. 14, the requested resource amount gradually increases and gradually decreases and the processing time of the job is also changed accordingly. Thus, a model which can derive the processing time of the job may be generated by learning the change in the processing time for each process type through machine learning or the like, as shown in the graph 51302 of FIG. 14, and the predicted end time may be computed by using this model in the end time prediction processing. For example, a model that has at least a response time of data transfer based on the process type, a processing computation time per parallel processing unit of the process, the number of reads, the number of writes, the number of pieces of read data computed from the data source and the read unit, and the parallel number as feature amounts and computes the processing time of the job may be generated, and the processing time of the job may be computed using this model.

<Output Screen 51220>

FIG. 19 is a diagram illustrating an example of an output screen according to the second embodiment. The output screen illustrated in FIG. 19 shows an example of a case in which the output scree is implemented by a GUI. The same reference symbols are given to similar portions as those of the output screen 51210 according to the first embodiment.

The output screen 51220 includes a display area 51211 in which a job name of the registered job is displayed, a display area 51212 in which a recommended parallel processing number of the job is displayed, a display area 51213 in which an encouraged start time recommended for the registered job is displayed, and a display area 51214 in which the predicted end time of the registered job is displayed.

For example, the output screen 51220 of FIG. 19 shows that the processing of "job A" is executed with the parallel number of 20, a start time is 00:00 Jan. 2, 2020, and a predicted end time of the job is 01:00 Jan. 2, 2020.

In the foregoing embodiment, the maximum parallel number is displayed on the output screen 51220. However, for example, the management computer 200 may have a function of configuring the job execution server 110 so that the job is executed with the maximum parallel number computed in the maximum parallel number computation processing.

On the output screen 51220, a set of a predicted end time, a start time, and a parallel number in a case in which completion of another job is not awaited may be displayed using the values computed in steps S1509 and S1510 for each predicted end time of the other job.

As described above, according to the second embodiment, when a certain registered job can be executed, it can be determined whether the registered job is executed at a designated time or executed after awaiting completion of another job based on the completion time of the job of another ETL processing, and can be determined a start time at which the job is completed earliest.

In the second embodiment, the predicted end time of the job is computed using the processing time or the response time of the process measured in advance. However, when the job has already been executed, an execution time and a progress of the job may be measured to predict the predicted end time.

Third Embodiment

Next, a data analytics platform management system according to a third embodiment will be described. In the following description, differences from the first and second embodiments will be mainly described and description of similar components, programs that have similar functions, and tables that have similar items will be omitted or simplified using the same reference symbols.

In the data analytics platform management system according to the first and second embodiment, the parallel number of the job or the start time of the job in which the completion of the job is the shortest in accordance with the load of the data analytics platform 100 or the predicted end time of the job of another ETL processing has been determined. However, when a data analyst has a specific period of a end time of a job, the job cannot be completed within the period due to resources of the data analytics platform that are used by another job in the method of first and second embodiments in some cases.

Accordingly, in the data analytics platform management system according to the third embodiment, an example will be described in which the data analyst is allowed to configure an allowed end time of the completion of the job, and when executing a certain registered job, predict a predicted end time of the job, and change the parallel number of another job within the allowed end time of the other job when the predicted end time exceeds the allowed end time.

The management computer 200 according to the third embodiment displays an input screen 51120 instead of the input screen 51110. In the management computer 200 according to the third embodiment, the registered job information storage unit 800 according to the second embodiment stores a registered job information table 860 instead of the registered job information table 850. The management computer 200 according to the third embodiment stores a maximum parallel number computation program 1120 instead of the maximum parallel number computation program 1110.

<Input Screen 51120>

Figure 20:
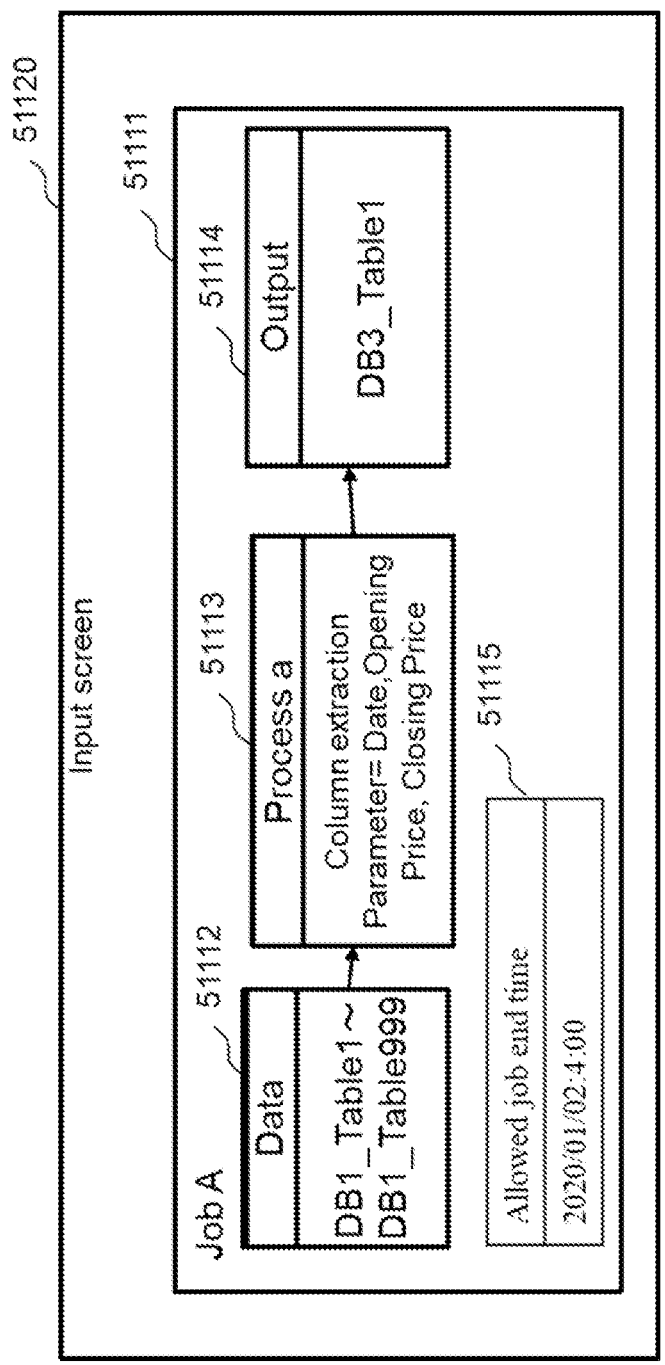
FIG. 20 is a diagram illustrating an example of an input screen according to a third embodiment.

FIG. 20 is a diagram illustrating an example of an input screen according to a third embodiment. The input screen illustrated in FIG. 20 shows an example of a case in which the input screen is implemented by a GUI. The same reference symbols are given to similar portions as those of the input screen 51110 according to the first embodiment.

The input area 51111 of the input screen 51120 includes a data node 51112, a process node 51113, an output node 51114, and an allowed job end time 51115. The allowed job end timer 51115 is an area in which an allowable period for the end time of the registered job can be defined by the data analyst. Based on information input in the input screen 51120, information regarding an allowed end timed of a job which is scheduled to be executed or is being executed is stored in the registered job information table 860.

For example, the input screen 51120 indicates that the allowed end time of the job A is 04:00 Jan. 2, 2020.

<Registered Job Information Storage Unit 800>

The registered job information storage unit 800 stores the registered job information table 860.

FIG. 21 is a diagram illustrating a configuration of a registered job information table according to a third embodiment. The same reference symbols are given to similar fields as those of the registered job information table 850, and description thereof will be omitted.

To store information regarding the job of the ETL processing registered by the data analyst, an entry of the registered job information table 860 includes fields of the job ID 811, the process ID 812, the process type ID 813, the parameter 814, the data source 815, the output 816, the start time 851, the predicted end time 852, the parallel number 853, a requested resource amount 861, an allowed end time 862, a minimum parallel number 863, and a minimum requested resource amount 864.

In the requested resource amount 861, a requested resource amount when the job with a parallel number stored in the parallel number 853 would be executed is stored. In the allowed end time 862, an allowed end time of the job input by the data analyst is stored. In the minimum parallel number 863, a minimum parallel number required to meet the allowed end time is stored. In the minimum requested resource amount 864, a requested resource amount (a minimum requested resource amount) of each component of the data analytics platform 100 when the job would be executed with the minimum parallel number is stored.

For example, an entry 19001 of the registered job information table 860 indicates that the registered job A will be executed with the parallel number of 20 and a requested resource amount at that time is, for example, 2 Gbps at a received transfer rate of the network I/F 153. Further, this indicates that completion of the job until 04:00 Jan. 2, 2020, is requested, a necessary minimum parallel number of the job is 10, a requested resource amount at the time of execution with the minimum parallel number is, for example, 1 Gbps at the received transfer rate of the network I/F 153.

The minimum parallel number and the minimum requested resource amount may be computed at a time point at which the allowed end time of the job is configured. For example, the minimum parallel number and the minimum requested resource amount may be derived by executing the end time prediction processing, inputting a designated value as a start time, and searching for a value at which the predicted end time output in the end time prediction processing is closest to the value of the allowed end time while changing the parallel number to any value. The requested resource amount and the minimum requested resource amount may be computed based on the requested resource amount per parallel processing unit computed in the requested resource amount computation processing, the parallel number of the parallel number 853, or the minimum parallel number of the minimum parallel number 863.

<Maximum Parallel Number Computation Processing>

The maximum parallel number computation processing is processing executed by allowing the CPU 211 to execute the maximum parallel number computation program 1120 of the management computer 200 and further includes processing for searching for a parallel number (or a use resource amount) of another job satisfying all of the allowed end times of the registered job and other jobs when the registered job does not satisfy the allowed end time for a free resource amount of a current situation.

FIG. 22 is a flowchart illustrating maximum parallel number computation processing according to the third embodiment.

The maximum parallel number computation processing is executed, for example, when completion of the free resource amount computation processing and the requested resource amount computation processing is detected.

In step S2001, the maximum parallel number computation program 1120 executes the maximum parallel number computation processing (see FIG. 16) of the second embodiment.

In step S2002, the maximum parallel number computation program 1120 acquires the allowed end time from the registered job information table 860 with regard to the registered job acquired in step S901 of the free resource amount computation processing.

In step S2003, the maximum parallel number computation program 1120 determines whether the predicted end time derived in step S2001 is later than the allowed end time. When the result of the determination is true (Yes in S2003), the maximum parallel number computation program 1120 causes the processing to proceed to step S2004. When the result of the determination is false (No in S2003), the maximum parallel number computation program 1120 causes the processing to proceed to step S2012.

In step S2004, the maximum parallel number computation program 1120 stores the free resource amounts of the components on the data transfer path of the registered job computed in the free resource amount computation processing.

In step S2005, the maximum parallel number computation program 1120 acquires other job information from the registered job information table 860 and stores the other job information in a queue. The other job information acquired here may be limited to a job executed during the same period. The same period indicates that, for example, a period indicated by the allowed end time from the start time of the registered job overlaps a period indicated by the allowed end time from a start time of another job. The job acquired here may be limited to a job overlapping in a path of data transfer with the registered job.

In step S2006, the maximum parallel number computation program 1120 determines whether the queue in step S2005 is free. When the result of the determination is true (Yes in S2006), the maximum parallel number computation program 1120 causes the processing to proceed to step S2013. When the result of the determination is false (No in S2006), the maximum parallel number computation program 1120 causes the processing to proceed to step S2007.

In step S2007, the maximum parallel number computation program 1120 acquires one piece of job information from the queue in step S2005. Here, the job of the acquired job information is referred to as a target job.

In step S2008, the maximum parallel number computation program 1120 computes a free resource amount of each component when the target job is changed to the minimum parallel number from the free resource amount stored in step S2004. When the current parallel number configured value of the target job is reduced to the minimum parallel number, a resource amount which can be reduced can be computed with (requested resource amount—minimum requested resource amount). By adding the value to the free resource amount, it is possible to compute the free resource amount in the case of the change to the minimum parallel number.

In step S2009, the maximum parallel number computation program 1120 updates the free resource amount stored in step S2004 and stores information regarding the target job (target job information).

In step S2010, the maximum parallel number computation program 1120 determines whether the free resource amount satisfies the requested resource amount of the registered job by comparing the requested resource amount of the requested resource amount 861 of the registered job with the free resource amount updated in step S2009. When the result of the determination is true (Yes in S2010), the maximum parallel number computation program 1120 causes the processing to proceed to step S2011. When the result of the determination is false (No in S2010), the parallel number computation program 1120 causes the processing to proceed to step S2006.

In step S2011, the maximum parallel number computation program 1120 outputs a pair of identification information of another job (the target job) stored in step S2009 and minimum parallel number. For example, the maximum parallel number computation program 1120 may display the output screen 51220 to request the data analyst to change the parallel number of the other job or may request the job execution server 110 to change the parallel number.

In step S2012, the maximum parallel number computation program 1120 outputs the maximum parallel number (a value equal to the minimum parallel number in this example) of the registered job, the start time, and the predicted end time. For example, the maximum parallel number computation program 1120 may display the output screen 51220 to request the data analyst to configure execution of the registered job or may request the job execution server 110 to configure execution of the registered job.

In step S2013, the maximum parallel number computation program 1120 outputs that the predicted end time is later than the allowed end time. For example, the maximum parallel number computation program 1120 displays that the predicted end time is later than the allowed end time on the output screen 51220.

As described above, according to the third embodiment, in the case that the free resource amount lacks for the allowed end time configured by the data analyst when executing the registered job, a combination with another job to which the parallel number would be reduced to satisfy the allowed end time can be specified.

In the third embodiment, the maximum parallel number computation processing of the second embodiment has been all executed in the maximum parallel number computation processing. However, only steps S1501 and S1502 may be executed without executing the processing (steps S1503 to S1514) for searching for the start time of the maximum parallel number computation processing of the second embodiment in the maximum parallel number computation processing.

In the third embodiment, the example of the case in which the parallel number of the job can be changed during the execution of the job has been described. However, when the parallel number cannot be changed during the execution of the job in the data analytics platform, an available resource amount of the registered job may be increased by changing (reducing) the available resource amount of the job by the server, the storage device, the RDBMS software, or the like. For example, when the storage device 130 has a function of configuring an upper limit in a throughput for a specific I/O port from a specific server, an available resource amount of an I/O port of another job can be reduced and requested resource amounts of other components can also be accordingly reduced. Thus, when the parallel number of the job executed by the job execution server 110 cannot be changed, the registered job can be appropriately executed.

In this case, in step S2008 of the maximum parallel number computation processing, the maximum parallel number computation program computes not the free resource amount when the execution with the minimum parallel number would be executed but the free resource amount satisfying the minimum requested resource amount (that is, equal to the free resource amount when the job with the minimum parallel number would be executed). For example, when the function of configuring the upper limit of the throughput of the I/O port is used, an upper limit can be set only in a throughput between the RDBMS server 120 and the I/O port 131 in this function. Therefore, in step S2007 of the maximum parallel number computation processing, when the other job information is extracted from a queue, it is necessary to group jobs accessing the same RDBMS server 120, collectively acquire the grouped job from the queue, and execute the subsequent processing on the grouped jobs.

The present invention is not limited to the foregoing embodiments and can be appropriately modified within the scope of the present invention without departing from the gist of the present invention.

For example, in the foregoing embodiments, some or all of the processing executed by the processor may be executed by dedicated hardware circuits. The programs according to the foregoing embodiments may be installed from program sources. The program sources may be a program distribution server or a storage media (for example, a portable storage media).

What is claimed is:

1. A management computer managing a data processing infrastructure including a job execution server that is configured to execute a job and a storage device that is coupled to the job execution server via a network and configured to store data used for processing in accordance with the job, the management computer comprising: a storage device; and a processor coupled to the storage device, wherein the storage device is configured to store maximum resource amount information which is information regarding a maximum resource amount of components related to communication between the job execution server and the storage device of the data processing infrastructure, path information which is information regarding a path to data of the storage device of the data processing infrastructure, and load information which is information regarding loads of the components of the data processing infrastructure, and wherein the processor is configured to compute a free resource amount of the components forming a path, which is related to execution of a predetermined job, from the job execution server to the data of the storage device, based on the maximum resource amount information, the path information, and the load information, and determine a parallelizable number which is a parallel executable number in a parallel executable processing unit which is used in the job in the execution of the predetermined job in the job execution server, based on the free resource amount;

wherein the storage device is configured to store data capacity information which is information regarding a data capacity per unit of the parallelizable processing unit in the job, and wherein the processor is configured to specify the data capacity of the data in the parallelizable processing unit of the job, based on the data capacity information, compute a requested resource amount which is a resource amount necessary in the execution per unit of the parallelizable processing unit, based on the specified data capacity, and determine the parallelizable number, based on the free resource amount and the requested resource amount.

2. The management computer according to claim 1, wherein the storage device is configured to further store response time information which is information regarding a response time related to data transfer, and wherein the processor is configured to compute the requested resource amount, based on the response time information and the data capacity.

3. The management computer according to claim 1, wherein the storage device is configured to store process type information which is information regarding each type of process included in the job, and wherein the processor is configured to compute the requested resource amount, based on the process type information and the type of process included in the predetermined job.

4. The management computer according to claim 1, wherein the processor is configured to display the determined parallelizable number.

5. The management computer according to claim 1, wherein the processor is configured to configure a parallel number in execution of the parallelizable processing unit of the job in the job execution server, based on the parallelizable number.

6. The management computer according to claim 1, wherein the processor is configured to determine performance of the job execution server necessary in the execution of the predetermined job, based on the parallelizable number.

7. The management computer according to claim 1, wherein the processor is configured to predict loads of the components of the data processing infrastructure used by the predetermined job and determine the parallelizable number, based on the predicted loads.

8. The management computer according to claim 1, wherein, for at least part of the components of the data processing infrastructure, autoscale configuring, in which a number of units is automatically changeable, is applied, and wherein the processor is configured to compute the free resource amount, based on the autoscale configuring.

9. The management computer according to claim 1, wherein the storage device is configured to store other job information including a start time and a parallel number of another job executed in the data processing infrastructure, and wherein the processor is configured to determine a start time and the parallelizable number of the predetermined job, based on the other job information.

10. The management computer according to claim 1, wherein the processor is configured to compute a minimum parallel number satisfying a allowed end time of each job executed in the data processing infrastructure, based on the allowed end time, and determine a job in which the parallel number is to be reduced among the other jobs when a parallel number necessary in the execution of the predetermined job is not obtained.

11. The management computer according to claim 1, wherein the processor is configured to compute a minimum requested resource amount satisfying an allowed end time of each job executed in the data processing infrastructure, based on the allowed end time, and determine a job in which an allocated resource amount is to be reduced among the other jobs when the parallel number necessary in the execution of the predetermined job is not obtained.

12. The management computer according to claim 1, wherein the predetermined job includes a plurality of processes including processing for a plurality of parallelizable processing units, and wherein the processor is configured to determine a parallelizable number for each process and display the parallelizable number for each process.

13. A management system comprising: at least one of a job execution server and a storage device in a data processing infrastructure including the job execution server that is configured to execute a job and the storage device that is coupled to the job execution server via a network and that is configured to store data used for processing in accordance with the job, and a management computer configured to the data processing infrastructure, wherein the management computer is configured to store maximum resource amount information which is information regarding a maximum resource amount of components related to communication between the job execution server and the storage device of the data processing infrastructure, path information which is information regarding a path to data of the storage device from the job execution server of the data processing infrastructure, and load information which is information regarding loads of the components of the data processing infrastructure, and wherein the management computer is configured to compute a free resource amount of the components forming the path to the data of the storage device related to execution of a predetermined job, based on the maximum resource amount information, the path information, and the load information, and determine a parallelizable number which is a parallel executable number in a parallel executable processing unit which is used in the job in the execution of the predetermined job in the job execution server, based on the free resource amount;

wherein the storage device is configured to store data capacity information which is information regarding a data capacity per unit of the parallelizable processing unit in the job, and wherein the processor is configured to specify the data capacity of the data in the parallelizable processing unit of the job, based on the data capacity information, compute a requested resource amount which is a resource amount necessary in the execution per unit of the parallelizable processing unit, based on the specified data capacity, and determine the parallelizable number, based on the free resource amount and the requested resource amount.

14. A non-transitory computer-readable recording medium recording a management program to be executed by a computer managing a data processing infrastructure including a job execution server that is configured to execute a job and a storage device that is coupled to the job execution server via a network and configured to store data used for processing in accordance with the job, the management program causing the computer to compute a free resource amount of components forming a path to data of the storage device related to execution of a predetermined job, based on maximum resource amount information which is information regarding a maximum resource amount of the components related to communication between the job execution server and the storage device of the data processing infrastructure, path information which is information regarding a path to data of the storage device of the data processing infrastructure, and load information which is information regarding loads of the components of the data processing infrastructure, and to determine a parallelizable number which is a parallel executable number in a parallel executable processing unit which is used in the job in the execution of the predetermined job in the job execution server, based on the free resource amount;

wherein the storage device is configured to store data capacity information which is information regarding a data capacity per unit of the parallelizable processing unit in the job, and wherein the processor is configured to specify the data capacity of the data in the parallelizable processing unit of the job, based on the data capacity information, compute a requested resource amount which is a resource amount necessary in the execution per unit of the parallelizable processing unit, based on the specified data capacity, and determine the parallelizable number, based on the free resource amount and the requested resource amount.

\* \* \* \* \*